(12) United States Patent
Hoshi

(10) Patent No.: US 8,305,503 B1
(45) Date of Patent: Nov. 6, 2012

(54) PHASE DIFFERENCE ELEMENT AND DISPLAY DEVICE

(75) Inventor: Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/533,623

(22) Filed: Jun. 26, 2012

Related U.S. Application Data

(63) Continuation of application No. 13/037,873, filed on Mar. 1, 2011, now Pat. No. 8,223,280, which is a continuation of application No. 12/747,850, filed as application No. PCT/JP2009/067770 on Oct. 14, 2009, now Pat. No. 8,089,569.

(30) Foreign Application Priority Data

Oct. 15, 2008 (JP) ................ P2008-266314

(51) Int. Cl.
*G02F 1/1335* (2006.01)

(52) U.S. Cl. ............ 349/15; 349/117; 349/119; 348/51; 359/465

(58) Field of Classification Search .......... None
See application file for complete search history.

(56) References Cited

U.S. PATENT DOCUMENTS

| | | | |
|---|---|---|---|
| 2006/0285026 A1* | 12/2006 | Robinson | 349/15 |
| 2009/0040401 A1* | 2/2009 | Tamura et al. | 349/15 |
| 2011/0002037 A1* | 1/2011 | Yeh et al. | 359/465 |

* cited by examiner

*Primary Examiner* — Richard Kim
(74) *Attorney, Agent, or Firm* — K&L Gates LLP

(57) ABSTRACT

A phase difference element and a display device having the phase difference element are provided. A base film 31 of the phase difference element 30 includes, for example, a thin resin film having optical anisotropy. A slow axis AX3 of the base film 31 points in a vertical or horizontal direction, and points in a direction intersecting with a slow axis AX1 of a right-eye region 32A of the phase difference element 30 and with a slow axis AX2 of a left-eye region 32B thereof. Thus, influence due to optical anisotropy of the base film 31 is exerted on each light being transmitted by the base film 31, so that the influence is not extremely greatly exerted on only one of light corresponding to a right eye and light corresponding to a left eye, the respective light being transmitted by the base film 31.

6 Claims, 20 Drawing Sheets

|  | EXAMPLE 1 | EXAMPLE 2 | COMPARATIVE EXAMPLE 1 | COMPARATIVE EXAMPLE 2 |
|---|---|---|---|---|
| LEFT-EYE REGION 32B | 120 | 120 | 70 | 420 |
| RIGHT-EYE REGION 32A | 120 | 120 | 420 | 70 |

| | | EXAMPLE 1 | EXAMPLE 2 | COMPARATIVE EXAMPLE 1 | COMPARATIVE EXAMPLE 2 |
|---|---|---|---|---|---|
| CASE THAT LEFT-EYE REGION 32B IS VIEWED FROM LEFT EYE SIDE OF POLARIZING GLASS | u' | 0.1868 | 0.1868 | 0.1873 | 0.1865 |
| | v' | 0.4322 | 0.4322 | 0.4378 | 0.4266 |
| CASE THAT RIGHT-EYE REGION 32A IS VIEWED FROM RIGHT EYE SIDE OF POLARIZING GLASS | u' | 0.1868 | 0.1868 | 0.1865 | 0.1873 |
| | v' | 0.4322 | 0.4322 | 0.4266 | 0.4378 |

PHASE DIFFERENCE ELEMENT AND DISPLAY DEVICE

CROSS REFERENCES TO RELATED APPLICATIONS

The present application is a continuation of U.S. patent application Ser. No. 13/037,873 filed Mar. 1, 2011, which is a continuation of U.S. patent application Ser. No. 12/747,850 filed Jun. 11, 2010 and which issued as U.S. Pat. No. 8,089,569 on Jan. 3, 2012, which is a national stage of International Application No. PCT/JP2009/067770 filed Oct. 14, 2009, and claims priority to Japanese Application No. JP 2008-266314 filed Oct. 15, 2008, the entire contents of which are incorporated herein by reference.

TECHNICAL FIELD

The present invention relates to a phase difference element having optical anisotropy and a display device having the element, and particularly relates to a phase difference element preferably used in observation of a three-dimensional image by using a polarizing glass, and a display device having the phase difference element.

BACKGROUND

In a certain type of three-dimensional image display device using a polarizing glass in the past, light in different polarization states are outputted from left-eye pixels and right-eye pixels, respectively. In such a display device, while a viewer puts on a polarizing glass, light outputted from left-eye pixels is allowed to enter only into a left eye, and light outputted from right-eye pixels is allowed to enter only into a right eye, so that a three-dimensional image may be observed.

For example, in patent literature 1, a phase difference element is used to output light in different polarization states between left-eye pixels and right-eye pixels. In the phase difference element, a flake-like phase difference member having a slow axis or a fast axis in one direction is provided in correspondence to left-eye pixels, and a flake-like phase difference member having a slow axis or a fast axis in a direction different from the one direction of the above phase difference member is provided in correspondence to right-eye pixels.

CITATION LIST

Patent Literature

Patent literature 1: Japanese Patent No. 3360787

DISCLOSURE OF THE INVENTION

In the above display device, it is desirable that picture light for a left eye outputted from left-eye pixels enters only into a left eye, and picture light for a right eye outputted from right-eye pixels enters only into a right eye. However, a problem called ghost may occur in the device, that is, picture light for a left eye slightly enters even to a right eye, or picture light for a right eye slightly enters even into a left eye.

In particular, in the display device according to the patent literature 1, when a base includes a plastic film, a ghost may be clearly seen by only left eye or right eye due to optical anisotropy slightly exists in the base. Moreover, a problem of difference in picture color between right and left eyes may occur. When such imbalance occurs, a viewer hardly observes a three-dimensional image, or feels unpleasantness.

The problem of imbalance does not limitedly occur in the three-dimensional image display device, and commonly occurs in a phase difference element for separating incident light into light in at least two kinds of polarization states, or in a device using such a phase difference element.

In view of the foregoing problems, it is an object of the invention to provide a phase difference element, in which imbalance hardly occurs between right and left pictures during displaying a three-dimensional image, and provide a display device having the phase difference element.

A first phase difference element according to an embodiment of the invention includes a base film having optical anisotropy, and a phase difference layer having optical anisotropy formed on the base film. The phase difference layer has at least two kinds of phase difference regions with slow axes having different directions from each other, and the at least two kinds of phase difference regions are adjacently and regularly arranged in an in-plane direction of the base film. Each phase difference region has the slow axis in a direction intersecting with a border with an adjacent phase difference region at an angle other than a right angle, and the base film has a slow axis in a direction parallel or orthogonal to the border.

A first display device according to an embodiment of the invention includes a display panel being driven according to an image signal, a backlight unit irradiating the display panel, and a phase difference element provided on a side opposite to the backlight unit with respect to the display panel. The phase difference element incorporated in the display device is configured of the same components as those of the first phase difference element.

In the first phase difference element and the first display device according to the invention, at least two kinds of phase difference regions, which have slow axes having different directions from each other, are adjacently and regularly arranged in an in-plane direction of the base film. Thus, for example, light entering from a phase difference region side (opposite side to a base film side) is separated into at least two kinds of light different in polarization state from each other, and then transmitted by the base film. Each phase difference region has the slow axis in a direction intersecting with the border at an angle other than a right angle, and the base film has the slow axis in a direction parallel or orthogonal to the border. Therefore, influence due to optical anisotropy of the base film is exerted on each light being transmitted by the base film, so that the influence is not extremely greatly exerted on only one of the at least two kinds of light being transmitted by the base film.

A second phase difference element according to an embodiment of the invention includes a base film having optical anisotropy, and a phase difference layer having optical anisotropy formed on the base film. The phase difference layer has at least two kinds of phase difference regions with slow axes having different directions from each other, and the at least two kinds of phase difference regions are adjacently and regularly arranged in an in-plane direction of the base film. A slow axis of the base film intersects with the slow axis of each phase difference region.

A second display device according to an embodiment of the invention includes a display panel being driven according to an image signal, a backlight unit irradiating the display panel, and a phase difference element provided on a side opposite to the backlight unit with respect to the display panel. The phase difference element incorporated in the display device is configured of the same components as those of the second phase difference element.

In the second phase difference element and the second display device according to the invention, at least two kinds of phase difference regions, which have slow axes having different directions from each other, are adjacently and regularly arranged in an in-plane direction of the base film. Thus, for example, light entering from a phase difference region side (opposite side to a base film side) is separated into at least two kinds of light different in polarization state from each other, and then transmitted by the base film. The slow axis of the base film intersects with the slow axis of each phase difference region. Therefore, influence due to optical anisotropy of the base film is exerted on each light being transmitted by the base film, so that the influence is not extremely greatly exerted on only one of the at least two kinds of light being transmitted by the base film.

According to the first and second phase difference elements and the first and second display devices of the invention, influence due to optical anisotropy of the base film is exerted on each light being transmitted by the base film, so that the influence is not extremely greatly exerted on only one of the at least two kinds of light being transmitted by the base film. This may reduce imbalance including a ghost clearly seen by only left eye or right eye, or difference in picture color between right and left eyes. Consequently, a phase difference element and a display device, in which such imbalance hardly occurs, may be achieved.

Figure 1:
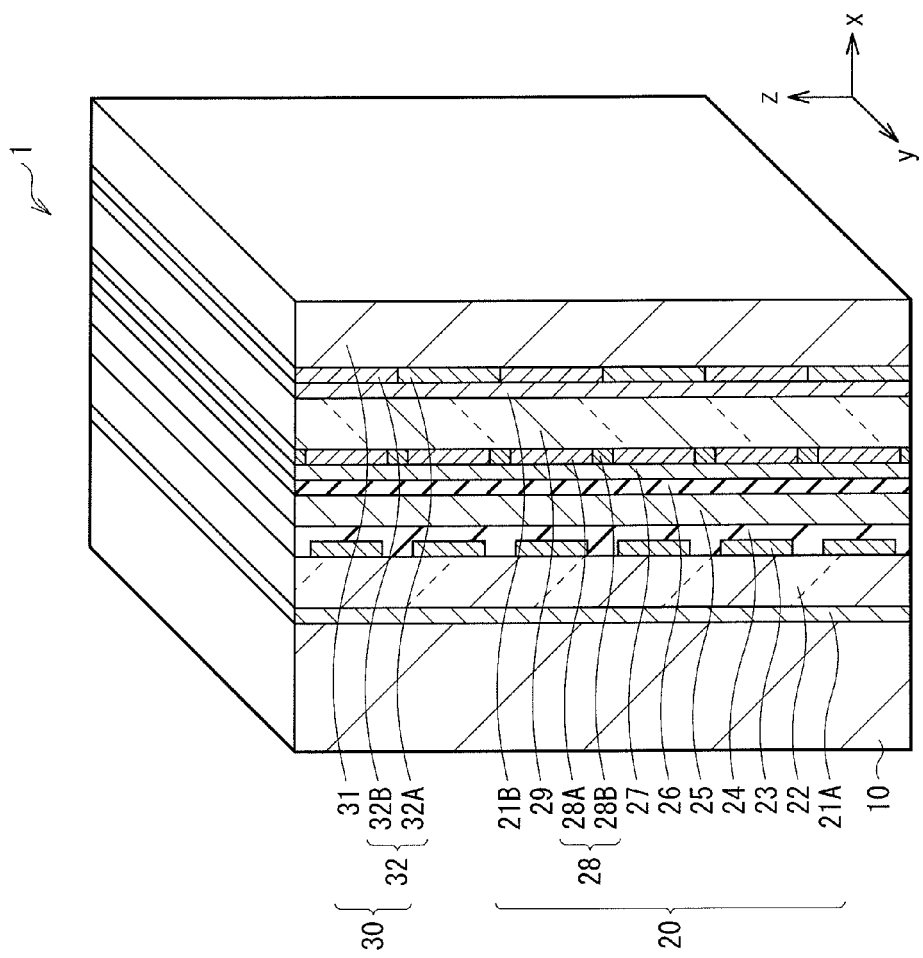
FIG. 1 is a section diagram showing an example of a configuration of a display device according to an embodiment of the invention.

REFERENCE SIGNS LIST 1 display device
2 polarizing glass
10 backlight unit
20 liquid crystal display panel
21A, 21B polarizing plate
22, 29 transparent substrate
23 pixel electrode
24, 26 alignment film
25 liquid crystal layer
27 common electrode
28 color filter
28A filter section
28B black matrix section
30 phase difference element
31 base film
31' base film having resin layer formed thereon
32 phase difference layer
32A right-eye region
32B left-eye region
32C third region
40 black stripe section
40A transmission section
40B light blocking section
41 right-eye glass
42 left-eye glass
41A, 42A polarizing plate
41B right-eye phase difference film
42B left-eye phase difference film
43 UV curing resin layer
43D UV curing resin liquid
46 liquid crystal layer
46D liquid crystal
110 master
110A reversal pattern
200, 350 unwind roller
210 pattern roller
220, 230, 250, 260 guide roller
240 nip roller
270, 390 take-up roller
280, 360 discharger
290, 380 ultraviolet irradiator
370 heater AX1, AX2, AX3, AX5, AX6 slow axis
AX4, AX7, AX8 polarization axis (transmission axis)
L light outputted from display device 1
L1 border
L2 right-eye image light
L3 left-eye image light
θ1, θ2 angle

BEST MODE(S) FOR CARRYING OUT THE INVENTION

Hereinafter, the best mode for carrying out the invention (hereinafter, referred to as embodiment) will be described in detail with reference to drawings. Description is made in the following sequence.
1. Embodiment (display device and phase difference element)
2. Modification (display device and phase difference element)
3. Example (display device)

FIG. 1 shows a sectional configuration of a display device according to an embodiment of the invention. A phase difference element according to an embodiment of the invention is described with a case, as an example, where the element is incorporated in the display device of the embodiment.

[Configuration of Display Device 1]

A display device 1 of the embodiment is of a polarizing glass type, which displays a three-dimensional image to an observer (not shown) putting on a polarizing glass 2 described later in front of eye balls. The display device 1 is configured by sequentially stacking a backlight unit 10, a liquid crystal display panel 20 (display panel), and a phase difference element 30. In the display device 1, a surface of the phase difference element 30 is a picture display surface, and is pointed to an observer side. In addition, in the embodiment, the display device 1 is disposed such that the picture display surface is parallel to a perpendicular surface (vertical surface, a y-z plane in FIG. 1). Further, the picture display surface has, for example, a rectangular shape, and a longitudinal direction of the picture display surface is parallel to a horizontal direction (y-axis direction in the figure). Further, the observer observes the picture display surface while putting on the polarizing glass 2 in front of eye balls of the observer.

[Backlight Unit 10]

The backlight unit 10 has, for example, a reflective plate, a light source and an optical sheet (all are not shown). The reflective plate returns light emitted from the light source to an optical sheet side, and has functions of reflection, scattering, diffusion and the like. The reflective plate includes, for example, PET (Polyethylene Terephthalate) foam. Thus, light emitted from the light source may be efficiently used. The light source irradiates the liquid crystal display panel 20 from the back, and includes, for example, a plurality of linear light sources arranged in parallel at constant intervals, or a plurality of point-like light sources arranged in a two-dimensional array. In addition, as the linear light source, for example, a hot cathode fluorescent lamp (HCFL), a cold cathode fluorescent lamp (CCFL) or the like is listed. As the point-like light source, for example, a light emitting diode (LED) or the like is listed. The optical sheet equalizes in-plane luminance distribution of light from the light source, or adjusts an angle of divergence and a polarization state of light from the light source into a desired range, and includes, for example, a diffusion plate, a diffusion sheet, a prism sheet, a reflective polarizing element, and a phase difference plate. Further, the light source may be of an edge light type. In such a case, a light guide plate or a light guide film is used as necessary.

[Liquid Crystal Display Panel 20]

The liquid crystal display panel 20 is a transmissive display panel in which a plurality of pixels are two-dimensionally arranged in row and column directions, and drives each pixel in accordance with a picture signal for image display. The liquid crystal display panel 20 has, for example, a polarizing plate 21A, a transparent substrate 22, pixel electrodes 23, an alignment film 24, a liquid crystal layer 25, an alignment film 26, a common electrode 27, a color filter 28, a transparent substrate 29 (counter substrate) and a polarizing plate 21B in order from a backlight unit 10 side as shown in FIG. 1.

Here, the polarizing plate 21A is disposed on a light incidence side of the liquid crystal display panel 20, and the polarizing plate 21B is disposed on a light emitting side of the liquid crystal display panel 20. The polarizing plates 21A and 21B are a kind of optical shutter, and transmits only light (polarized light) in a certain vibration direction. For example, the polarizing plates 21A and 21B are disposed such that polarization axes thereof are different by a certain angle (for example, 90 degrees) from each other, so that emitted light from the backlight unit 10 is transmitted through the liquid crystal layer, or blocked by the liquid crystal layer.

A direction of a transmission axis (not shown) of the polarizing plate 21A is set within a range in which light emitted from the backlight unit 10 may be transmitted. For example, when a polarization axis of light emitted from the backlight unit 10 is in a vertical direction, the transmission axis of the polarizing plate 21A is also in a vertical direction, and when a transmission axis of light emitted from the backlight unit 10 is in a horizontal direction, the transmission axis of the polarizing plate 21A is also in a horizontal direction. In addition, light emitted from the backlight unit 10 is not limited to linearly polarized light, and may be circularly or elliptically polarized light, or non-polarized light.

Figure 2:
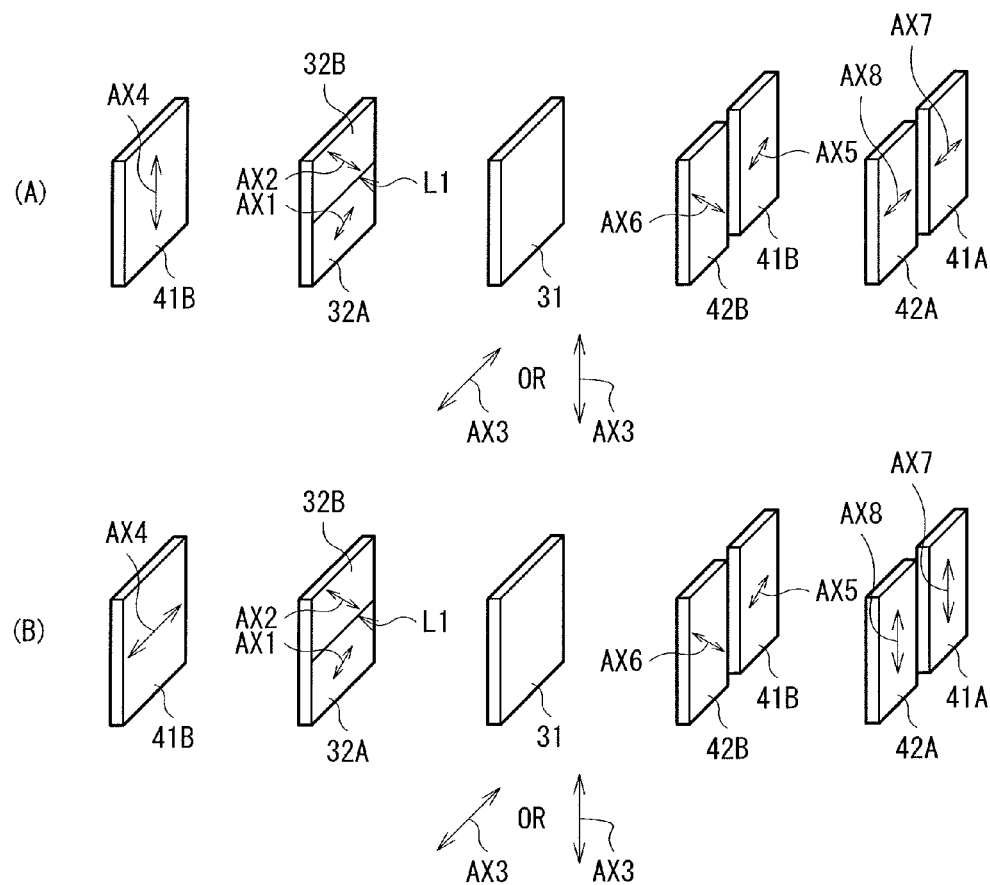
FIG. 2 is conceptual diagrams for illustrating transmission axes and slow axes in the display device of FIG. 1.

A direction of a polarization axis AX4 (FIG. 2) of the polarizer 21B is set within a transmittable range of light transmitted by the liquid crystal display panel 20. For example, when a polarization axis (not shown, polarization axis is synonymous with transmission axis) of the polarizer 21A is in a horizontal direction, the polarization axis AX4 is in a direction (perpendicular direction) orthogonal to the horizontal direction (FIG. 2A). When the polarization axis of the polarizer 21A is in a perpendicular direction, the polarization axis AX4 is in a direction (horizontal direction) orthogonal to the perpendicular direction (FIG. 2B).

The transparent substrates 22 and 29 are typically transparent to visible light. In addition, a transparent substrate on a backlight unit 10 side has, for example, an active drive circuit formed thereon, the circuit including TFT (Thin Film Transistor) as drive elements electrically connected to transparent pixel electrodes, and wiring lines. The pixel electrodes 23 include, for example, Indium Tin Oxide (ITO), and function as electrodes for each of pixels. The alignment film 24 includes, for example, a polymer material such as polyimide for alignment treatment of liquid crystal. The liquid crystal layer 25 includes, for example, VA (Vertical Alignment) mode liquid crystal, TN (Twisted Nematic) mode liquid crystal, or STN (Super Twisted Nematic) mode liquid crystal. The liquid crystal layer 25 has a function of transmitting or blocking light emitted from the backlight unit 10 for each pixel in response to applied voltage from a not-shown drive circuit. The common electrode 27 includes, for example, ITO, and functions as a common counter electrode. The color filter 28 is formed by arranging filter sections 28A for separating light emitted from the backlight unit 10 into, for example, respective light of three primary colors of red (R), green (G) and blue (B). The color filter 28 has a black matrix section 28B having a light blocking function in a region between the filter sections 28A corresponding to a boundary between pixels.

[Phase Difference Element 30]

Next, the phase difference element 30 will be described. FIG. 3(A) perspectively shows an example of a configuration of the phase difference element 30 of the embodiment. FIG. 3(B) shows slow axes of the phase difference element 30 of FIG. 3(A). Similarly, FIG. 4(A) perspectively shows another example of the configuration of the phase difference element 30 of the embodiment. FIG. 4(B) shows slow axes of the phase difference element 30 of FIG. 4(A). The phase difference element 30 shown in FIGS. 3(A) and (B) is different from the phase difference element 30 shown in FIGS. 4(A) and (B) in a direction of a slow axis AX3 of a base film 31 (described later).

The phase difference element 30 changes a polarization state of light transmitted by the polarizer 21B of the liquid crystal display panel 20. The phase difference element 30 has, for example, the base film 31 and a phase difference layer 32 as shown in FIG. 1.

The base film 31 includes, for example, a thin resin film having optical anisotropy. The resin film preferably has small optical anisotropy or low birefringence. A resin film having such a property includes, for example, TAC (triacetyl cellulose), COP (cycloolefin polymer), and PMMA (polymethyl methacrylate) or the like. COP includes, for example, ZEONOR® or ZEONEX® (ZEON CORPORATION) and ARTON® (JSR Corporation) or the like. Thickness of the base film 31 is, for example, preferably 30 µm to 500 µm both inclusive. Retardation of the base film 31 is preferably 20 nm or less, and more preferably 10 nm or less.

The base film 31 may have a single-layer structure or a multilayer structure. In the case where the base film 31 has a multilayer structure, the film has, for example, a double-layer structure where a resin layer (not shown) having a function of aligning a material of the phase difference layer 32 is formed on a surface of the base film 31. The resin layer is preferably substantially free from light absorption or coloring unlike a light alignment film or a polyimide alignment film in the past. For example, acrylic curable resin may be used for the resin layer. In addition, in the description, the base film includes even a base film, on which the resin layer is formed, unless otherwise specified.

In addition, for example, a plurality of (here, two) kinds of groove regions (not shown) are patterned in correspondence to right-eye regions 32A and left-eye regions 32B of the phase difference layer 32 on a surface of the base film 31 (in the case of providing the resin layer, on a surface of the resin layer). The groove regions are alternately arranged, for example, in a stripe pattern. Width of each stripe is, for example, equal to a pixel pitch of the display device 1.

In the respective groove regions, a plurality of small grooves extend in the same direction. Then, an extending direction of small grooves corresponding to the right-eye regions 32A is, for example, orthogonal to an extending direction of small grooves corresponding to the left-eye regions 32B. The extending directions of the grooves make angles of −45° and +45°, respectively with the stripe direction of the groove regions as a reference.

In addition, for example, opening width of each of the small grooves (a pitch of the small grooves) is preferably 2 µm or less (more preferably 1 µm or less). The pitch of the small grooves is controlled to be 2 µm or less, thereby a material (for example, a liquid crystal material described later) configuring the phase difference layer 32 is easily aligned on the small grooves in manufacturing process.

Figure 3:
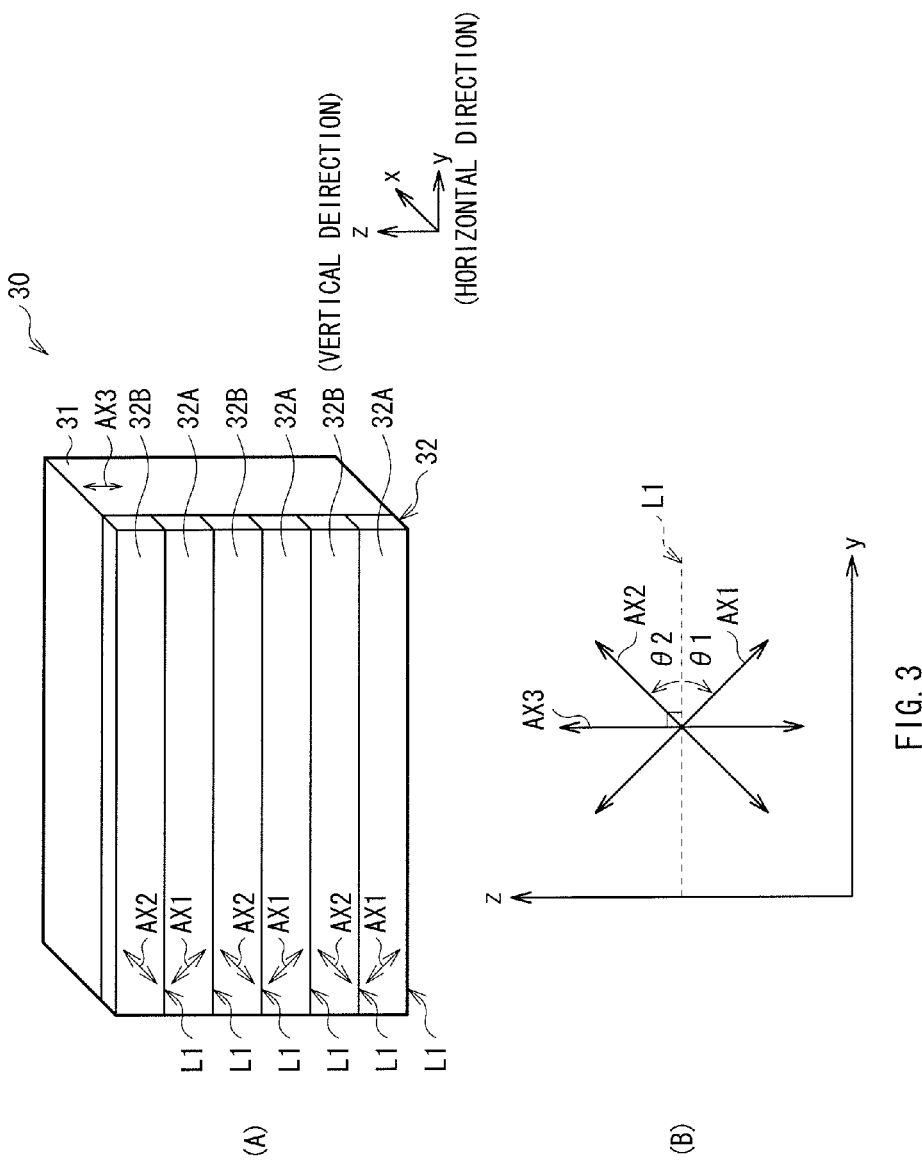
FIG. 3 is configuration diagrams showing an example of a configuration and the slow axes of a phase difference element in FIG. 1.
Figure 4:
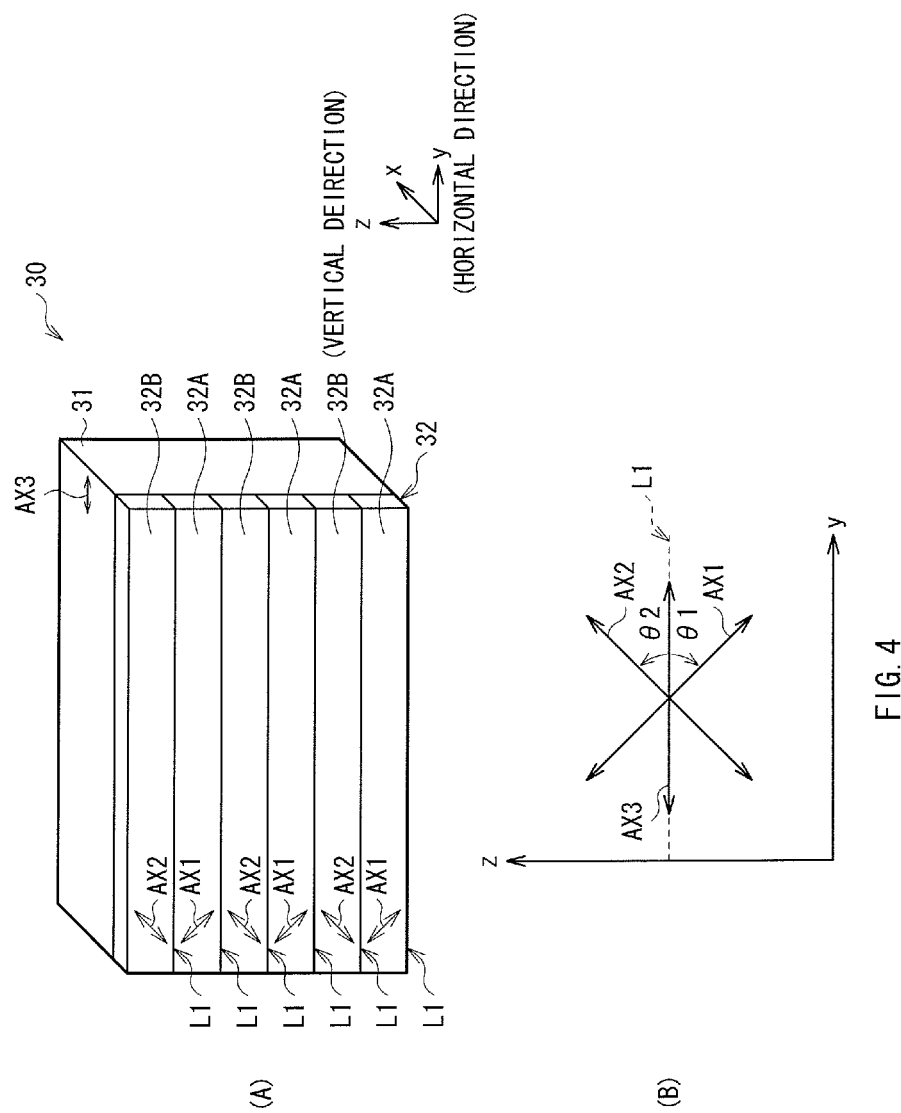
FIG. 4 is configuration diagrams showing another example of the configuration and the slow axes of the phase difference element in FIG. 1.

The slow axis AX3 of the base film 31 points, for example, in a vertical direction (FIG. 3(B)) or a horizontal direction (FIG. 4(B)) as shown in FIGS. 3 and 4. More particularly, the slow axis AX3 points in the same direction as a short-side direction or a long-side direction of the right-eye regions 32A and the left-eye regions 32B so that the slow axis AX3 points in a direction orthogonal to or in the same direction as a direction of a border L1. The slow axis AX3 preferably points in a direction intersecting with slow axes AX1 and AX2, and points a direction parallel to a bisector (bisector in a vertical or horizontal direction) of an angle made by the slow axes AX1 and AX2.

In addition, in this description, "parallel", "orthogonal", "vertical" and "the same direction" include substantially parallel, substantially orthogonal, substantially vertical, and substantially the same direction, respectively within a range without losing the advantage of the invention. For example, each one includes some error caused by various factors such as a manufacturing error and variation.

The phase difference layer 32 is a thin layer having optical anisotropy. The phase difference layer 32 is provided on a surface of the base film 31, and attached to a surface (polarizing plate 21B) on a light emitting side of the liquid crystal display panel 20 by an adhesive (not shown) or the like (FIG. 1). The phase difference layer 32 has two kinds of phase difference regions (right-eye regions 32A and left-eye regions 32B) with slow axes having different directions from each other. The right-eye regions 32A of the embodiment corresponds to a specific example of "one kind of phase difference regions" of the invention, and the left-eye regions 32B of the embodiment corresponds to a specific example of "the other kind of phase difference regions" of the invention.

The phase difference layer 32 includes, for example, a polymerizable polymer liquid crystal material. For example, in the phase difference layer 32, liquid crystal molecules are fixedly aligned on the plurality of groove regions pattern-formed on the surface of the base film 31 (in the case of providing the resin layer, on the surface of the resin layer). As the polymer liquid crystal material, an appropriate material is selectively used depending on phase transition temperature (liquid crystal phase to/from isotropic phase), a refractive-index wavelength-dispersion characteristic of a liquid crystal material, a viscosity property, and process temperature. However, the material preferably has an acryloyl group or a metaacryloyl group as a polymerization group in the light of transparency. Moreover, it is preferable to use a material having no methylene spacer between a polymerizable functional group and a liquid crystal skeleton. Thus, alignment treatment temperature may be lowered during a process of the treatment. Thickness of the phase difference layer 32 is, for example, preferably 0.1 µm to 10 µm both inclusive. The phase difference layer 32 need not be configured of only a polymerized polymer liquid crystal material, and may partially include unpolymerized liquid-crystalline monomers. The unpolymerized liquid-crystalline monomers included in the phase difference layer 32 align in the same direction as an alignment direction of liquid crystal molecules around the monomers so as to have the same alignment characteristic as an alignment characteristic of the polymer liquid crystal material.

In addition, the base film 31 and the phase difference layer 32 may be directly contacted to each other, or may be provided with a different layer in between. The different layer includes an anchor layer for improving adhesion between the base film 31 and the phase difference layer 32. Moreover, a nonalignment thin film may be separately provided for improving alignment of a predetermined material (for example, the above liquid crystal material) configuring the phase difference layer 32 between the base film 31 (or the resin layer provided on the base film) and the phase difference layer 32. Thus, when the phase difference layer 32 is formed on the base film 31 during manufacturing process, the phase difference layer 32 may be less affected by molecular alignment of the surface of the base film 31.

The right-eye regions 32A and the left-eye regions 32B have, for example, strip shape extending in a common direction (horizontal direction), respectively as shown in FIGS. 1, 3(A) and 4(A). The right-eye regions 32A and the left-eye regions 32B are adjacently and regularly arranged in an in-plane direction of the base film 31, and specifically, alternately arranged in a short-side direction (vertical direction) of the right-eye regions 32A and the left-eye regions 32B. Therefore, borders L1 separating between the respective right-eye regions 32A and left-eye regions 32B point in the same direction as a long-side direction (horizontal direction) of the right-eye regions 32A and the left-eye regions 32B.

Each right-eye region 32A has the slow axis AX1 in a direction intersecting with the border L1 with an adjacent left-eye region 32B at an angle θ1 other than a right angle (0°<θ1<90°) as shown in FIGS. 3 and 4. In contrast, each left-eye region 32B has the slow axis AX2 in a direction intersecting with the border L1 with an adjacent right-eye region 32A at an angle θ2 other than a right angle (0°<θ2<90°), and in a direction different from the direction of the slow axis AX1, as shown in FIGS. 3 and 4.

Here, "a direction different from the direction of the slow axis AX1" means not only a direction different from the direction of the slow axis AX1, but also rotation in a direction opposite to a rotation direction of the slow axis AX1. Specifically, the slow axes AX1 and AX2 rotate in directions different from each other with respect to the border L1. The angle θ1 of the slow axis AX1 is preferably equal to the angle θ2 of the slow axis AX2 in absolute value (in the case that a rotation direction is not considered). However, the angles may be slightly different from each other due to a manufacturing error or the like. In some cases, the angles may be different from each other by an angle larger than an angle due to a manufacturing error. In addition, such an angle due to a manufacturing error is, for example, up to about 5° while being different depending on techniques for manufacturing the right-eye regions 32A and the left-eye regions 32B.

Hereinafter, description is made on a case where the polarizing glass 2 is of a circular polarizing type, and the display device 1 is a device for a circular polarizing glass. In this case, the angle θ1 is preferably +45°, and the angle θ2 is preferably −45°, for example.

As shown in FIGS. 2 to 4, each of the slow axes AX1 and AX2 points in a direction intersecting with each of horizontal and perpendicular directions, and besides, points in a direction intersecting with the slow axis AX3 of the base film 31. Moreover, the slow axes AX1 and AX2 preferably point in a direction such that a horizontal bisector of an angle made by the slow axes AX1 and AX2 points in a direction parallel to the border L1.

In addition, as shown in FIGS. 2(A) and (B), each of the slow axes AX1 and AX2 points in a direction intersecting with the polarization axis AX4 of the polarizing plate 21B on a light emitting side of the liquid crystal display panel 20. Furthermore, the slow axis AX1 points in a direction equal to or corresponding to a direction of a slow axis AX5 of a right-eye phase difference film 41B of the polarizing glass 2 described later, and points in a direction different from a direction of a slow axis AX6 of a left-eye phase difference film 42B. The slow axis AX2 points in a direction equal to or corresponding to the direction of the slow axis AX6, and points in a direction different from the direction of the slow axis AX5.

[Polarizing Glass 2]

Figure 5:
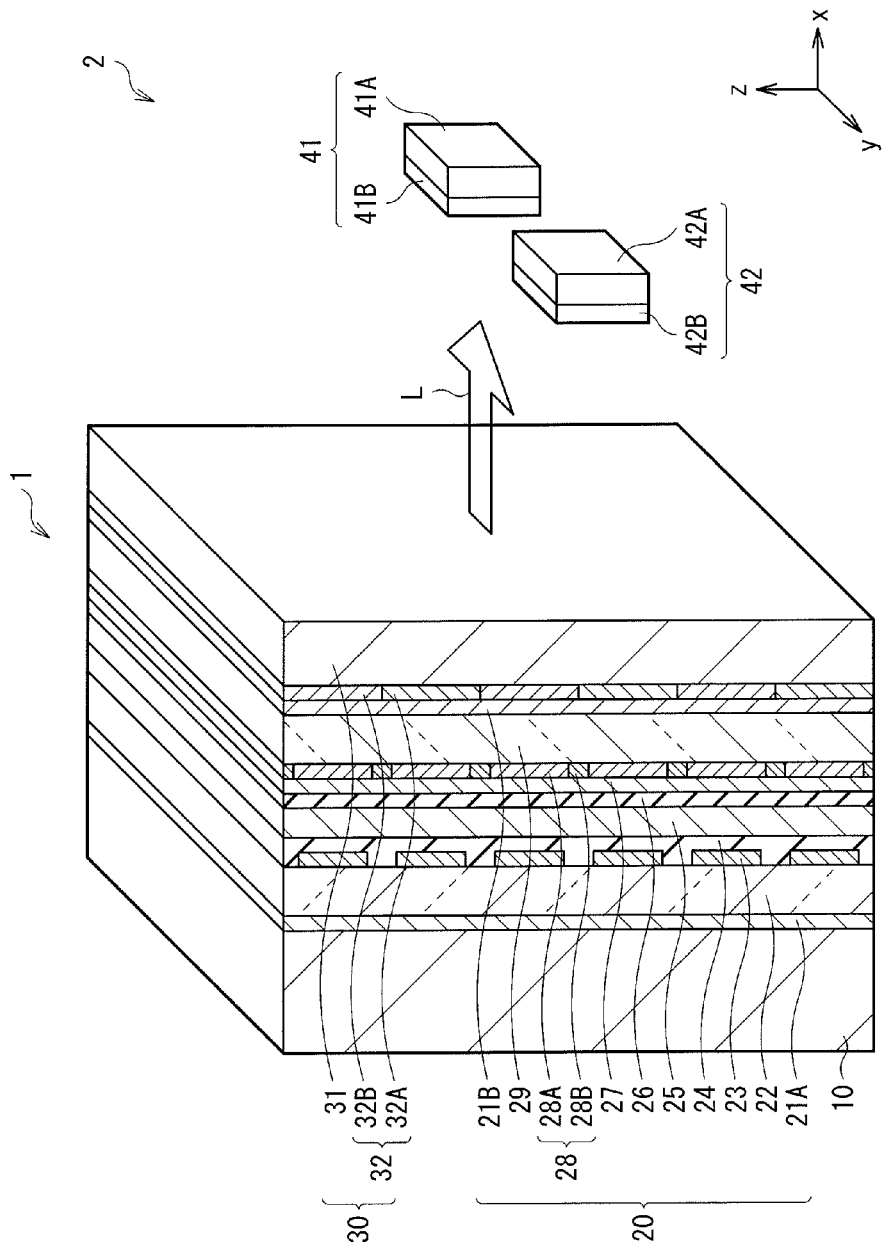
FIG. 5 is a system diagram showing a relationship between the display device of FIG. 1 and a polarizing glass.

Next, the polarizing glass 2 will be described. FIG. 5 perspectively shows an example of a configuration of the polarizing glass 2 together with the display device 1. The polarizing glass 2, which is put on in front of eye balls of an observer (not shown), is used by the observer when the observer observes a picture imaged on a picture display surface. The polarizing glass 2 has, for example, a right-eye glass 41 and a left-eye glass 42 as shown in FIG. 5.

The right-eye glass 41 and the left-eye glass 42 are disposed facing the picture display surface of the display device 1. In addition, while the right-eye glass 41 and the left-eye glass 42 are preferably disposed in one horizontal plane to the utmost as shown in FIG. 5, the glasses may be disposed in a flat plane being somewhat inclined.

The right-eye glass 41 has, for example, a polarizing plate 41A and the right-eye phase difference film 41B. The left-eye glass 42 has, for example, a polarizing plate 42A and the left-eye phase difference film 42B. The right-eye phase difference film 41B is provided on a surface of the polarizing plate 41A on an incidence side of light L outputted from the display device 1. The left-eye phase difference film 42B is provided on a surface of the polarizing plate 42A on an incidence side of the light L.

Each of the polarizing plates 41A and 42A is disposed on a light emitting side of the polarizing glass 2, and transmits only light in a certain vibration direction (polarized light). For example, in FIG. 2, each of polarization axes AX7 and AX8 of the polarizing plates 41A and 42A points in a direction orthogonal to the polarization axis AX4 of the polarizing plate 21B (on a light emitting side of the display panel). As illustrated in FIGS. 2(A) and (B), each of the polarization axes AX7 and AX8 points in a horizontal direction in the case that the polarization axis AX4 points in a vertical direction, and points in the vertical direction in the case that the polarization axis AX4 points in the horizontal direction, for example.

Each of the right-eye phase difference film 41B and the left-eye phase difference film 42B is a thin film having optical anisotropy. Thickness of each right-eye phase difference film is, for example, preferably 30 μm to 200 μm both inclusive. Moreover, such a phase difference film is preferably small in optical anisotropy, that is, in birefringence. A resin film having such a property includes, for example, COP (cycloolefin polymer) and PC (polycarbonate). COP includes, for example, ZEONOR® or ZEONEX® (ZEON CORPORATION) and ARTON® (JSR Corporation). As shown in FIG. 2, each of the slow axes AX5 of the right-eye phase difference film 41B and the slow axes AX6 of the left-eye phase difference film 42B points in a direction intersecting with each of horizontal and perpendicular directions, and besides, points in a direction intersecting with the respective polarization axes AX7 and AX8 of the polarizing plates 41A and 42A. Moreover, the slow axes AX5 and AX6 preferably point in a direction such that a vertical bisector of an angle made by the slow axes AX5 and AX6 points in a direction perpendicular to the border L1. The slow axis AX5 points in a direction equal to or corresponding to a direction of the slow axis AX1, and points in a direction different from a direction of the slow axis AX2. On the other hand, the slow axis AX6 points in a direction equal to or corresponding to a direction of the slow axis AX2, and points in a direction different from the direction of the slow axis AX1.

[Retardation]

Figure 6:
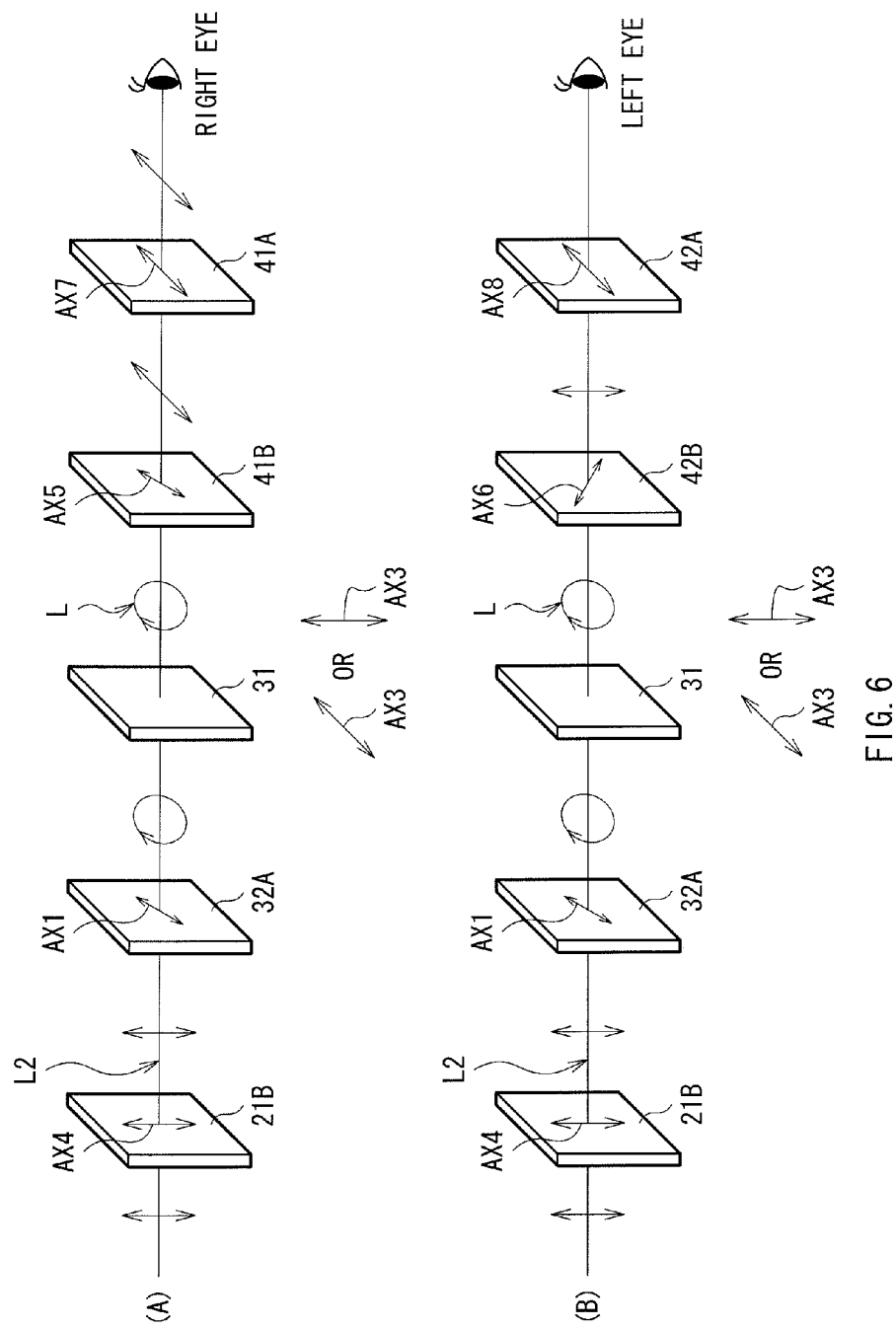
FIG. 6 is conceptual diagrams for illustrating an example of transmission axes and slow axes when a picture on the display device of FIG. 1 is observed by a right eye.
Figure 7:
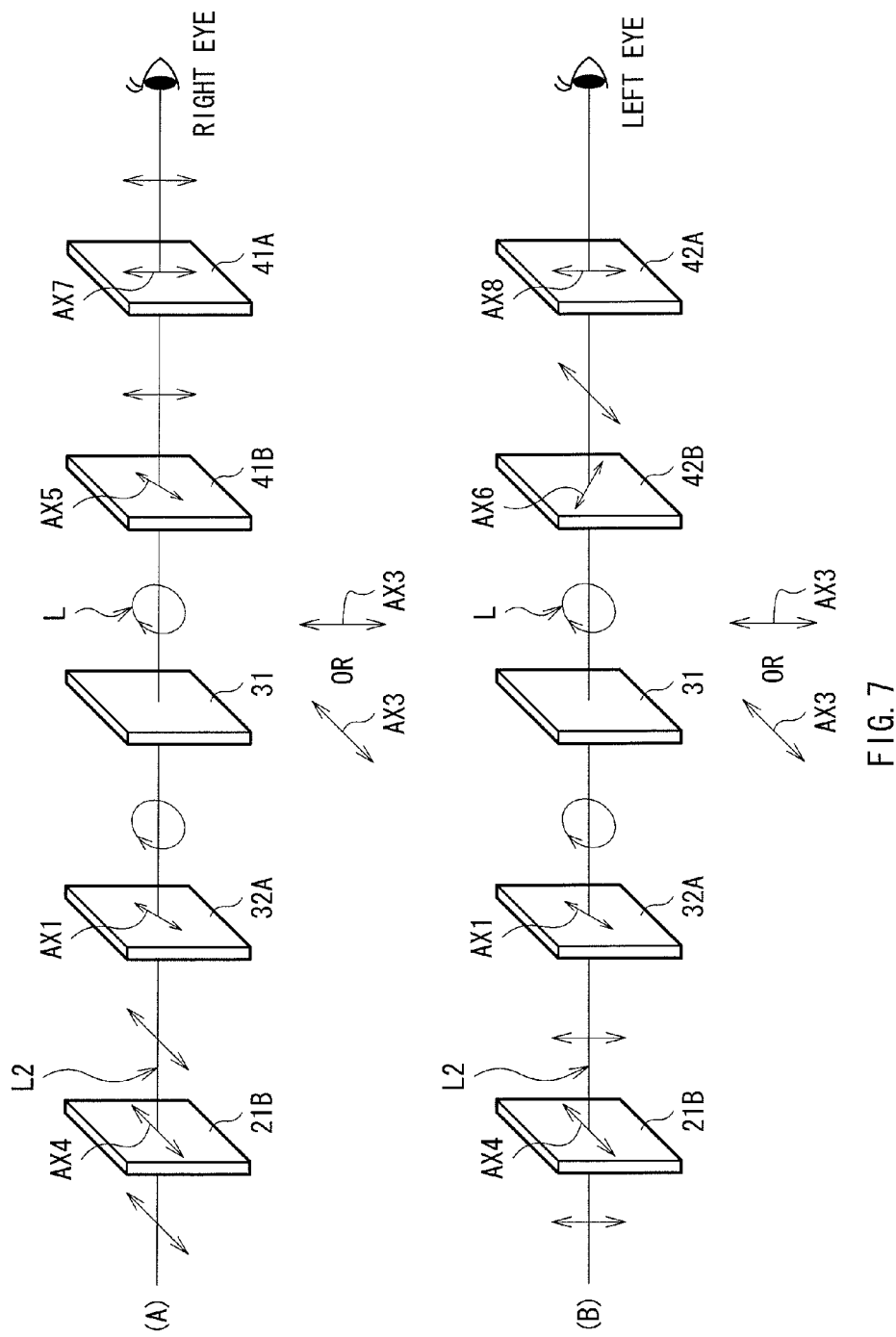
FIG. 7 is conceptual diagrams for illustrating another example of transmission axes and slow axes when a picture on the display device of FIG. 1 is observed by a right eye.
Figure 8:
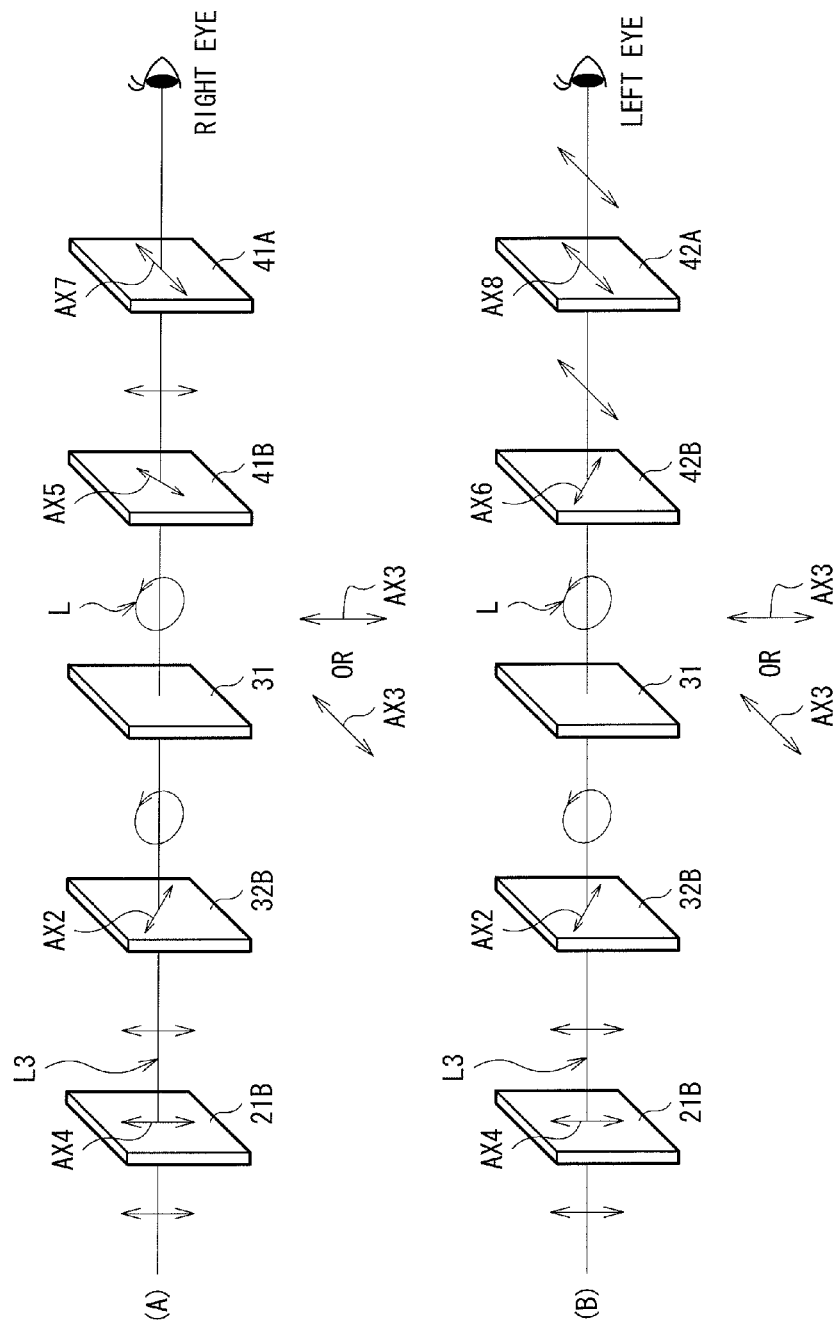
FIG. 8 is conceptual diagrams for illustrating an example of transmission axes and slow axes when a picture on the display device of FIG. 1 is observed by a left eye.
Figure 9:
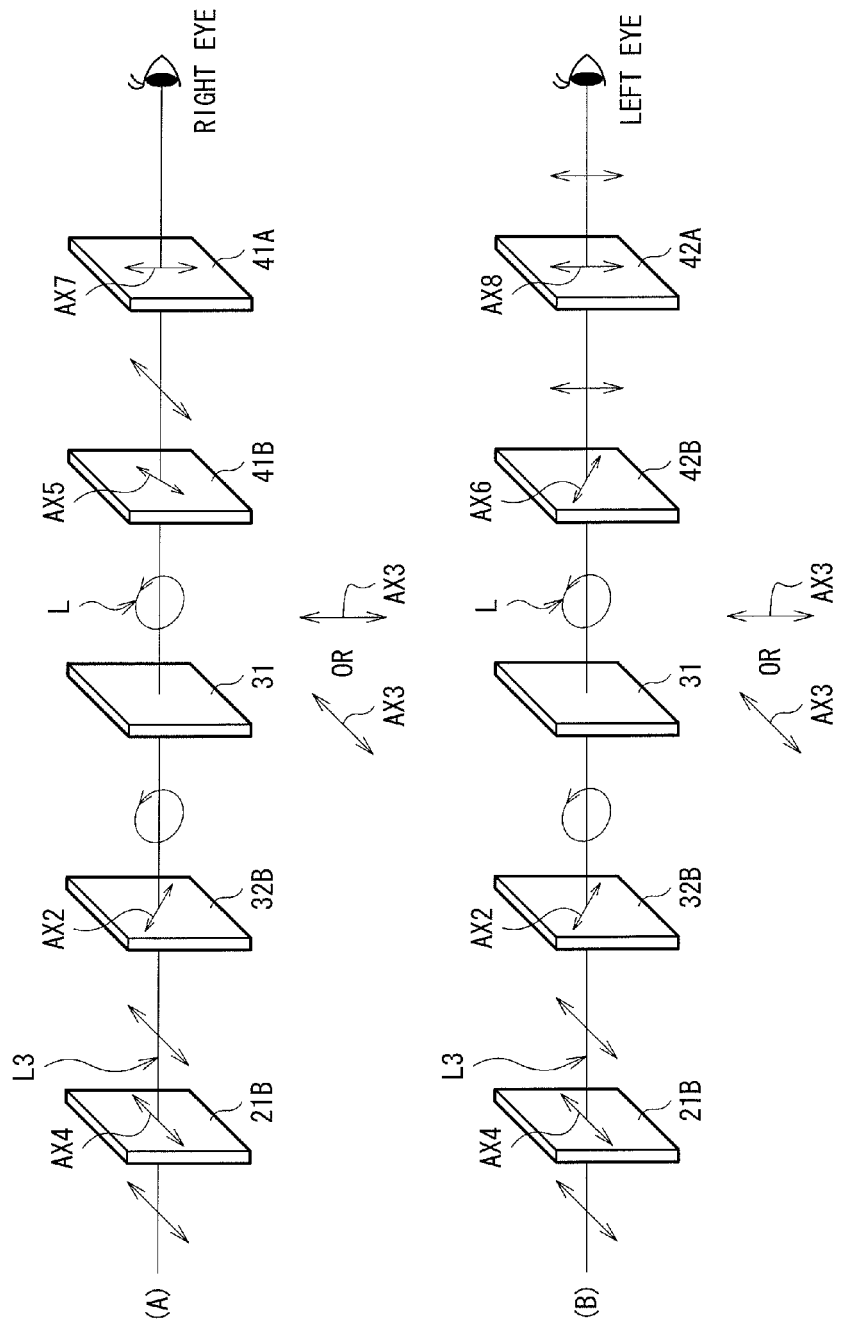
FIG. 9 is conceptual diagrams for illustrating another example of transmission axes and slow axes when a picture on the display device of FIG. 1 is observed by a left eye.

Retardation of each of the phase difference element 30 and the polarizing glass 2 will be described with reference to FIGS. 6 to 9. FIGS. 6 and 7 are conceptual diagrams showing how light L2 is recognized by both eyes via the polarizing glass 2 while only right-eye image light L2, which enters into the right-eye region 32A of the phase difference layer 32, is focused. FIGS. 8 and 9 are conceptual diagrams showing how light L3 is recognized by both eyes via the polarizing glass 2 while only left-eye image light L3, which enters into the right-eye region 32B of the phase difference layer 32, is focused.

In addition, while the right-eye image light L2 and the left-eye image light L3 are actually mixedly outputted, the right-eye image light L2 and the left-eye image light L3 are separately depicted in FIGS. 6 to 9 for convenience of description.

By the way, when a picture is observed by using the polarizing glass 2, for example, it is necessary that an image of right-eye pixels may be recognized by a right eye, and may not be recognized by a left eye, as shown in FIGS. 6(A), (B) and 7(A), (B). In addition, at the same time, for example, it is necessary that an image of left-eye pixels may be recognized by a left eye, and may not be recognized by a right eye, as shown in FIGS. 8(A), (B) and 9(A), (B). To achieve this, retardation of each of the right-eye region 32A and the right-eye phase difference film 41B, and retardation of each of the left-eye region 32B and the left-eye phase difference film 42B are preferably set in the following manner.

Specifically, it is preferable that one of the right-eye region 32A and the left-eye region 32B has retardation of $+\lambda/4$, and the other has retardation of $-\lambda/4$. Here, opposite signs of the respective retardation indicate that directions of the slow axes of the respective regions are different by 90° from each other. In this situation, retardation of the right-eye phase difference film 41B is preferably equal to retardation of the right-eye region 32A, and retardation of the left-eye phase difference film 42B is preferably equal to retardation of the left-eye region 32B.

[Basic Operation]

Next, an example of basic operation in image display of the display device 1 of the embodiment will be described with reference to FIGS. 5 to 9.

First, while light irradiated from the backlight unit 10 enters into the liquid crystal display panel 20, a parallax signal including a right-eye image and a left-eye image is inputted to the liquid crystal display panel 20 as a picture signal. Then, for example, the right-eye image light L2 is outputted from pixels in odd rows (FIGS. 6(A), (B) or FIGS. 7(A), (B)), and the left-eye image light L3 is outputted from pixels in even rows (FIGS. 8(A), (B) or FIGS. 9(A), (B)).

Then, the right-eye image light L2 and the left-eye image light L3 are converted into elliptical polarization by the right-eye region 32A and the left-eye region 32B of the phase difference element 30, respectively, and then transmitted by the base film 31 of the phase difference element 30, and then outputted to the outside from the image display surface of the display device 1. At that time, both of light passing through the right-eye region 32A and light passing through the left-eye region 32B are affected by slight optical anisotropy of the base film 31.

Then, light outputted to the outside of the display device 1 enters into the polarizing glass 2, and polarization of the light is returned from elliptical polarization to linear polarization by the right-eye phase difference film 41B and the left-eye phase difference film 42B, and then enters into the polarizing plates 41A and 42A of the polarizing glass 2.

At that time, as shown in FIGS. 6 and 7, among incident light to the polarizing plates 41A and 42A, light corresponding to the right-eye image light L2 has a polarization axis parallel to the polarization axis AX7 of the polarizing plate 41A, and orthogonal to the polarization axis AX8 of the polarizing plate 42A. Therefore, among incident light to the polarizing plates 41A and 42A, light corresponding to the right-eye image light L2 reaches a right eye of an observer only through the polarizing plate 41A.

In contrast, as shown in FIGS. 8 and 9, among incident light to the polarizing plates 41A and 42A, light corresponding to the left-eye image light L3 has a polarization axis orthogonal to the polarization axis AX7 of the polarizing plate 41A, and parallel to the polarization axis AX8 of the polarizing plate 22A. Therefore, among incident light to the polarizing plates 41A and 42A, light corresponding to the left-eye image light L3 reaches a left eye of an observer only through the polarizing plate 42A.

In this way, light corresponding to the right-eye image light L2 reaches a right eye of an observer, and light corresponding to the left-eye image light L3 reaches a left eye of the observer. As a result, the observer may recognize an image, which is displayed on the picture display surface of the display device 1, like a three-dimensional image.

[Advantage]

By the way, in the embodiment, the base film 31 of the phase difference element 30 includes, for example, a thin resin film having optical anisotropy. Therefore, both of light passing through the right-eye region 32A and light passing through the left-eye region 32B are affected by slight optical anisotropy of the base film 31 as mentioned above. As a result, when image light for a right eye or image light for a left eye reaches each eye of an observer, a ghost may be included in the image light. In addition, when image light for a right eye or image light for a left eye reaches each eye of an observer, the image light may be changed in color from an original color. A phase difference element, in which imbalance hardly occurs between right and left pictures during displaying a three-dimensional image, and a display device having the phase difference element are provided. A base film 31 of the phase difference element 30 includes, for example, a thin resin film having optical anisotropy. A slow axis AX3 of the base film 31 points in a vertical or horizontal direction, and points in a direction intersecting with a slow axis AX1 of a right-eye region 32A of the phase difference element 30 and with a slow axis AX2 of a left-eye region 32B thereof. Thus, influence due to optical anisotropy of the base film 31 is exerted on each light being transmitted by the base film 31, so that the influence is not extremely greatly exerted on only one of light corresponding to a right eye and light corresponding to a left eye, the respective light being transmitted by the base film 31.

However, in the embodiment, the slow axis AX3 of the base film 31 points in a horizontal or vertical direction, and besides, points in a direction intersecting with the slow axes AX1 and AX2. Therefore, influence due to optical anisotropy of the base film 31 is exerted on each light being transmitted by the base film 31, so that the influence is not extremely greatly exerted on only one of light corresponding to a right eye and light corresponding to a left eye, the respective light being transmitted by the base film 31. As a result, imbalance, such as a ghost clearly seen by only right eye or left eye, and difference in picture color between right and left eyes, may be reduced. Consequently, a phase difference element 30 and a display device 1, in which such imbalance hardly occurs, may be achieved.

In particular, in the embodiment, in the case that the slow axis AX3 of the base film 31 points in a direction parallel to a horizontal or vertical bisector of an angle made by the slow axes AX1 and AX2, influence due to optical anisotropy of the base film 31 is evenly exerted on each light being transmitted by the base film 31. As a result, imbalance, such as a ghost clearly seen by only right eye or left eye, and difference in picture color between right and left eyes, may be eliminated. Consequently, a phase difference element 30 and a display device 1, in which such imbalance does not occur, may be achieved.

Moreover, in the embodiment, in the case that a thin base film (for example, resin film) is used as a base for supporting the phase difference layer 32 of the phase difference element 30, the phase difference element 30 may be inexpensively manufactured with a high yield compared with a case that a glass plate is used as a base for supporting the phase difference layer 32. Moreover, the display device 1 may be reduced in thickness by using the thin base film (for example, resin film) as a base for supporting the phase difference layer 32.

[Method of Manufacturing Phase Difference Element 30]

Here, description will be made on an example of a method of manufacturing the phase difference element 30 according to the invention. Here, assuming that the phase difference element 30 has a plurality of groove regions, description is made separately in two cases of using a roll-like master and of using a sheet-like master in formation of the groove regions.

(Case of Using Roll-Like Master)

Figure 21:
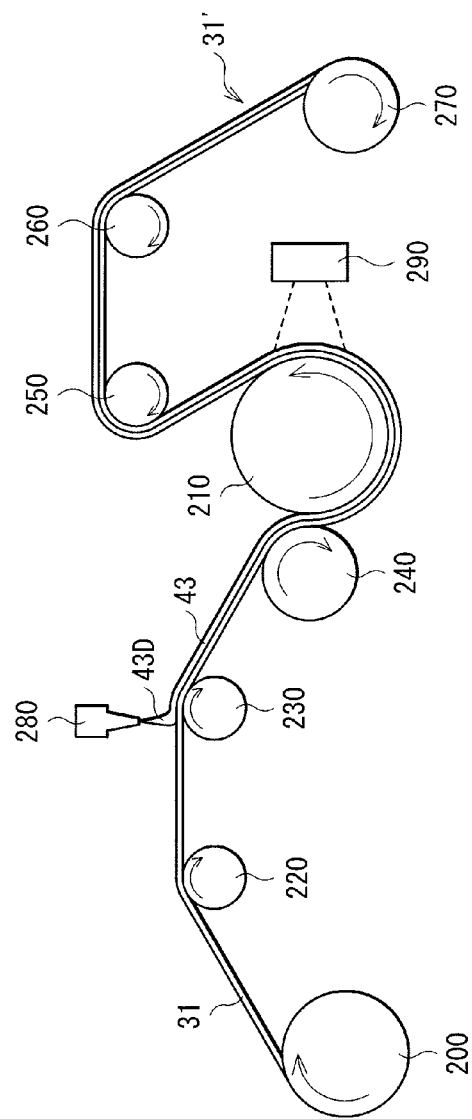
FIG. 21 is a schematic diagram showing an example of a configuration of manufacturing equipment used in an example of a method of manufacturing the phase difference element in FIG. 1.

FIG. 21 shows an example of a configuration of manufacturing equipment for forming a plurality of small grooves by means of a roll-like master. The manufacturing equipment of FIG. 21 includes an unwind roller 200, guide rollers 220, 230, 250 and 260, a nip roller 240, a pattern roller 210, a take-up roller 270, a discharger 280, and an ultraviolet irradiator 290. Here, the unwind roller 200 includes a concentrically-wound roll of base film 44, and supplies the base film 31. The base film 31 is unwound from the unwind roller 200, and then sequentially flows along the guide roller 220, the guide roller 230, the nip roller 240, the pattern roller 210, the guide roller 250 and the guide roller 260, and finally the base film 31 is taken up by the take-up roller 270. The guide rollers 220 and 230 guide the base film 31 supplied from the unwind roller 200 to the nip roller 240. The nip roller 240 presses the base film 31 supplied from the guide roller 230 to the pattern roller 210. The pattern roller 210 is disposed adjacently to the nip roller 240 with a certain gap. A circumferential face of the pattern roller 210 has reversal patterns of plurality of small grooves formed in correspondence to right-eye and left-eye regions of the phase difference element 30, respectively. The guide roller 250 separates the base film 31 wound on the pattern roller 210 from the pattern roller. The guide roller 260 guides the base film 31 separated by the guide roller 250 to the take-up roller 270. The discharger 280 is provided with a certain gap near a portion contacting the guide roller 230 of the base film 31 supplied from the unwind roller 200. The discharger 280 drops a UV curing resin liquid 43D including, for example, a UV curing acrylic-resin liquid onto the base film 31. The ultraviolet irradiator 290 irradiates ultraviolet rays to a portion, which has passed the nip roller 240 and contacts the pattern roller 210, of the base film 44 supplied from the unwind roller 200.

The manufacturing equipment having such a configuration is used to form the base film 31. Specifically, first, the base film 31 is unwound from the unwind roller 200, then the base film 31 is guided to the guide roller 230 via the guide roller 220, and then the UV curing resin liquid 43D is dropped onto the base film 31 by, for example, the discharger 280 so that the UV curing resin layer 43 is formed. Then, the UV curing resin layer 43 on the base film 31 is pressed to the circumferential face of the pattern roller 210 via the base film 44 by the nip roller 240. Thus, the UV curing resin layer 43 contacts the circumferential face of the pattern roller 210, so that an irregular pattern formed on the circumferential face of the pattern roller 210 is transferred to the UV curing resin layer 43.

Then, the ultraviolet irradiator 290 irradiates ultraviolet rays to the UV curing resin layer 43 so as to cure the UV curing resin layer 43. Then, the base film 31 is separated from the pattern roller 112 by the guide roller 250, and then taken up by the take-up roller 270 via the guide roller 260. In this way, a base film 31', on which a resin layer formed, is formed.

In addition, when the nonalignment thin film, which is not shown, is further formed, the thin film is formed after the plurality of small grooves is provided on the base film 31. For example, a UV curing resin layer is disposed on surfaces of the plurality of small grooves. The UV curing resin layer may include the same material as that of the UV curing resin layer configuring the above resin layer, or may include a different material. Next, the UV curing resin layer is irradiated with UV light and thus cured. Thus, a nonalignment thin film is formed in accordance with the surfaces of the plurality of small grooves. The nonalignment thin film may be formed by using equipment structured in series with the manufacturing equipment of FIG. 21 (not shown).

Figure 22:
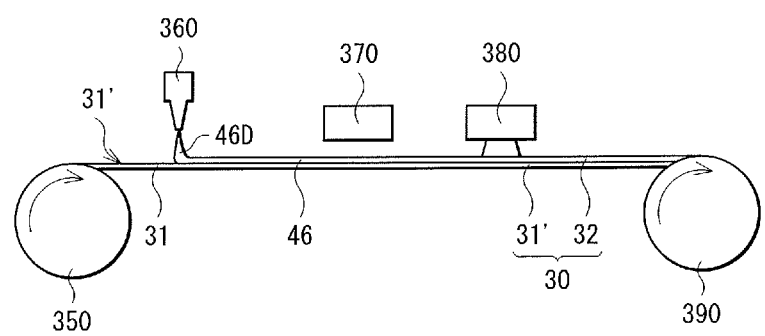
FIG. 22 is a schematic diagram showing an example of a configuration of manufacturing equipment used for steps following steps of FIG. 21.

Next, a method of forming the phase difference layer 32 will be described. First, as shown in FIG. 22, the base film 31' is unwound from an unwind roller 350, then liquid crystal 46D including liquid crystal monomers is dropped onto the surfaces of the plurality of small grooves (or a surface of the nonalignment thin film), so that a liquid crystal layer 46 is formed. Next, for the same purpose as in the above-mentioned manufacturing method, alignment treatment (heating treatment) is performed by using a heater 370 to the liquid crystal monomers of the liquid crystal layer 46 coated on a surface of the base film 31', and then the liquid crystal layer 46 is slowly cooled to a temperature slightly lower than a phase transition temperature of the monomers. Thus, the liquid crystal monomers are aligned in accordance with the patterns of the plurality of small grooves (or nonalignment thin film) formed on the surface of the base film 31'.

Next, an ultraviolet irradiator 380 irradiates UV light to the liquid crystal layer 46 subjected to the alignment treatment so that the liquid crystal monomers in the liquid crystal layer 46 are polymerized. At that time, while treatment temperature is typically close to room temperature, the temperature may be increased to the phase transition temperature or lower in order to adjust a retardation value. Thus, an alignment state of liquid crystal molecules is fixed along the patterns of the plurality of small grooves, so that the phase difference layer 32 (right-eye region 32A and left-eye region 32B) is formed. Thus, the phase difference element 30 is completed. Then, the phase difference element 30 is taken up by a take-up roller 390.

A reversal pattern of a master may be directly transferred to the base film 31 instead of providing the UV curing resin layer 43 to complete a base film having the plurality of small grooves formed thereon. In this case, the phase difference element 30 may be produced in the same way as in the above manufacturing method except that a step of forming the UV curing resin layer 43 is omitted.

In the embodiment, since high-temperature heating treatment is not necessary unlike the case that liquid crystal molecules are aligned by using an alignment film as in the past, a base film (for example, resin film), which is easily processed and inexpensive compared with a glass material, may be used.
(Case of Using Sheet-Like Master)

Figure 23:
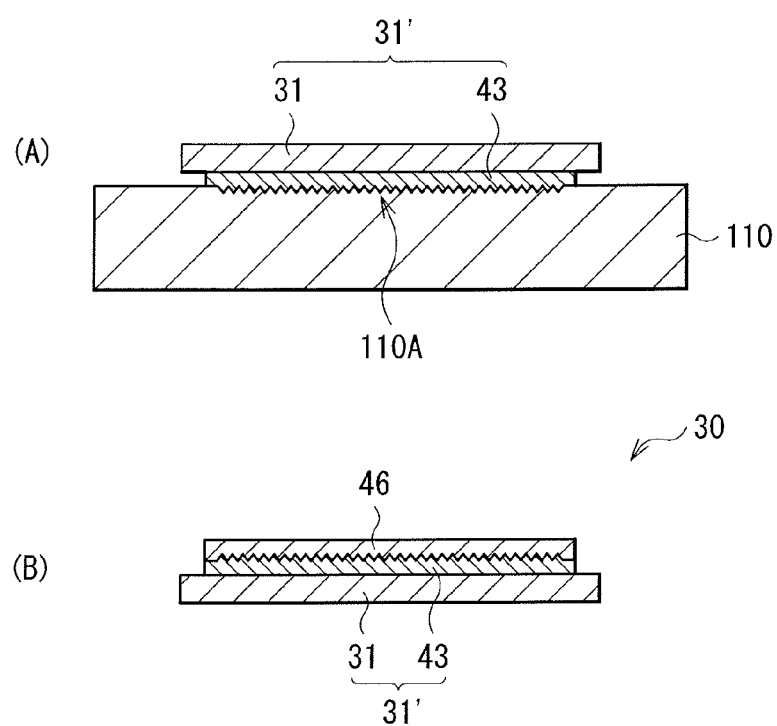
FIG. 23 is schematic diagrams for illustrating another example of the method of manufacturing the phase difference element in FIG. 1.

Next, a method of producing the phase difference element 30 in the case of using the sheet-like master is described with reference to FIG. 23. First, a base film 31 is prepared. Then, a UV curing resin layer 43 (for example, including acrylic resin) is disposed on a sheet-like master 110, on which reversal patterns 110A of the plurality of small grooves are formed in correspondence to a right-eye region and a left-eye region of a phase difference element 30, respectively, and then the UV curing resin layer 43 is enclosed by the base film 31. Next, the UV curing resin layer 43 is irradiated with ultraviolet rays and thus cured, and then the master 110 is separated. Thus, a base film 31', on which a resin layer is formed, is formed (FIG. 23(A)).

In addition, when the nonalignment thin film, which is not shown, is further formed, the thin film is formed after the plurality of small grooves is provided on the base film 31. For example, a UV curing resin layer or the like is disposed on surfaces of the plurality of small grooves. The UV curing resin layer may include the same material as that of the UV curing resin layer 43, or may include a different material. Next, the UV curing resin layer is irradiated with UV light and thus cured. Thus, a nonalignment thin film is formed in accordance with the surfaces of the plurality of small grooves.

Next, a method of forming a phase difference layer 32 will be described (FIG. 23(B)). First, a liquid crystal layer 46 including liquid crystal monomers is formed on the surfaces of the plurality of small grooves (or a surface of a nonalignment thin film) by coating using a roll coater or the like. At this time, for the liquid crystal layer 46, a solvent for dissolving the liquid crystal monomers, a polymerization initiator, a polymerization inhibitor, a surfactant, a leveling agent and the like may be used as necessary. While the solvent is not particularly limited, a solvent, which has high solubility of liquid crystal monomers, low vapor pressure at room temperature, and low vaporability at room temperature, is preferably used. As the solvent having low vaporability at room temperature, for example, 1-methoxy-2-acetoxypropane (PGMEA), toluene, methyl ethyl ketone (MEK), and methyl isobutyl ketone (MIBK) are listed. If a solvent having high vaporability at room temperature is used, vaporization speed of the solvent is too fast after the liquid crystal layer 46 is coated, so that alignment of liquid crystal monomers, which are formed through vaporization of the solvent, are likely to be disordered.

Next, alignment treatment (heating treatment) of the liquid crystal monomers of the liquid crystal layer 46 is performed. The heating treatment is performed at a temperature equal to or higher than a phase transition temperature of the liquid crystal monomers. In particular, in the case of using a solvent, the heating treatment is performed at a temperature equal to or higher than a drying temperature of the solvent. Here, shearing stress may be exerted on a boundary between the liquid crystal monomers and the small grooves due to coating of the liquid crystal monomers in the previous step, leading to alignment caused by flow of the monomers (flow alignment) or alignment caused by external force (external alignment), and consequently liquid crystal molecules may be aligned in an unintentional direction. The above-mentioned heating treatment is performed to temporarily cancel an alignment state of the liquid crystal monomers that have been aligned in such an unintentional direction. Thus, the solvent is dried out from the liquid crystal layer 46, so that only the liquid crystal monomers remains in the layer, and the liquid crystal layer is thus into an isotropic phase.

Next, the liquid crystal layer 46 is slowly cooled to a temperature slightly lower than the phase transition temperature. Thus, the liquid crystal monomers are aligned in accordance with the patterns of the plurality of small grooves (or nonalignment thin film).

Next, for example, UV light is irradiated to the liquid crystal layer 46 subjected to the alignment treatment so that the liquid crystal monomers are polymerized. In addition, at that time, while treatment temperature is typically close to room temperature, the temperature may be increased to the phase transition temperature or lower in order to adjust a retardation value. Thus, an alignment state of liquid crystal molecules is fixed along the patterns of the plurality of small grooves, so that the right-eye region 32A and the left-eye region 32B are formed. Thus, the phase difference element 30 is completed (FIG. 23(B)).

In addition, a reversal pattern 110A of a master may be directly transferred to the base film 31 instead of providing the UV curing resin layer 43 to complete a base film having the plurality of small grooves formed thereon. In this case, the phase difference element 30 may be produced in the same way as in the above manufacturing method except that a step of forming the UV curing resin layer 43 is omitted.

Figure 10:
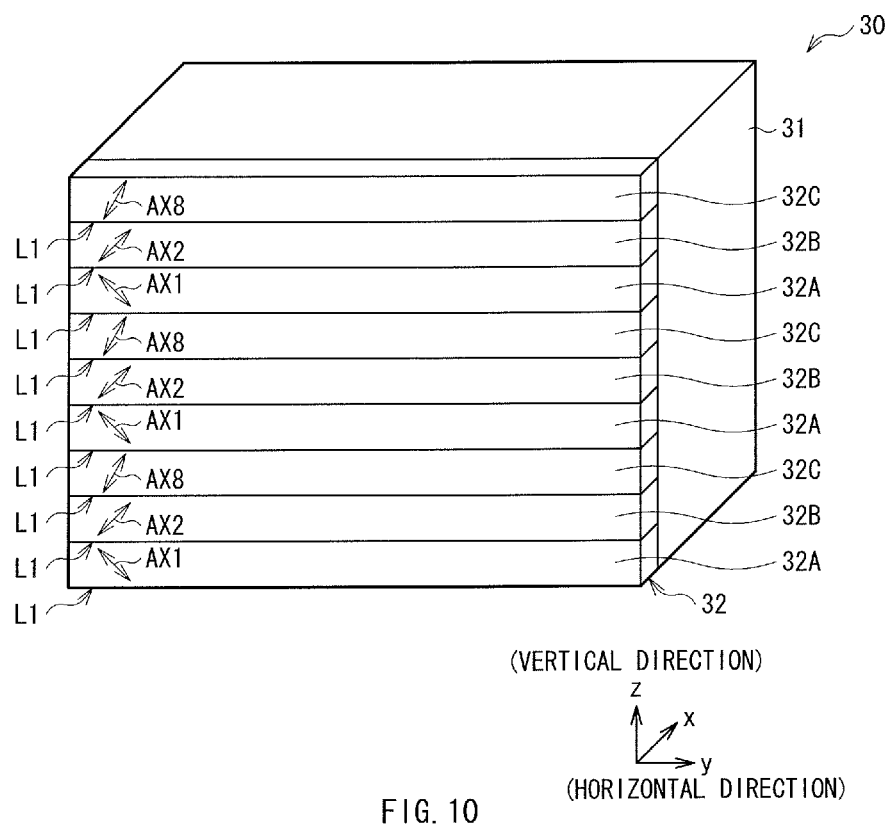
FIG. 10 is a configuration diagram showing another example of the phase difference element in FIG. 1.

In the embodiment, since high-temperature heating treatment is not necessary unlike the case that liquid crystal molecules are aligned by using an alignment film as in the past, a base film (for example, resin film), which is easily processed and inexpensive compared with a glass material, may be used.
Modification While the phase difference element 30 has two kinds of phase difference regions (right-eye region 32A and left-eye region 32B) having slow axes with different directions from each other, the phase difference element 30 may have at least three kinds of phase difference regions having slow axes with different directions from one another. For example, as shown in FIG. 10, the phase difference element 30 may have a third region 32C in addition to the right-eye region 32A and the left-eye region 32B, the region 32C having a slow axis with a direction different from each of directions of the slow axes AX1 and AX2 of the right-eye region 32A and left-eye region 32B.

Figure 11:
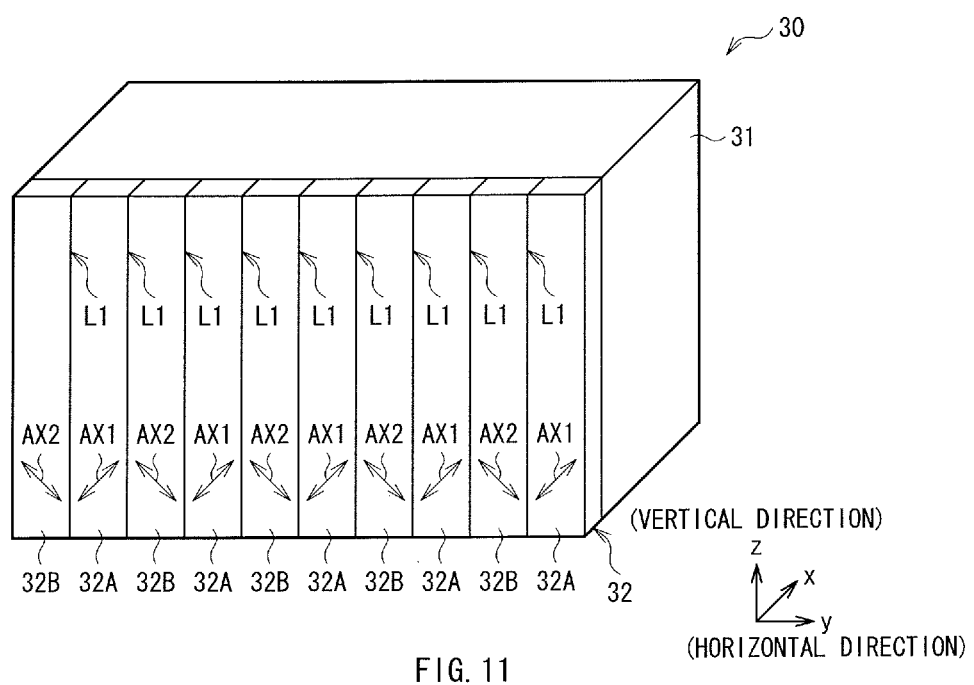
FIG. 11 is a configuration diagram showing still another example of the phase difference element in FIG. 1.

Moreover, while a case has been exemplified in the embodiment, in which each of the phase difference regions (right-eye region 32A and left-eye region 32B) of the phase difference element 30 extends in a horizontal direction, the region may extend in another direction. For example, as shown in FIG. 11, each of the phase difference regions (right-eye region 32A and left-eye region 32B) of the phase difference element 30 may extend in a vertical direction.

Figure 12:
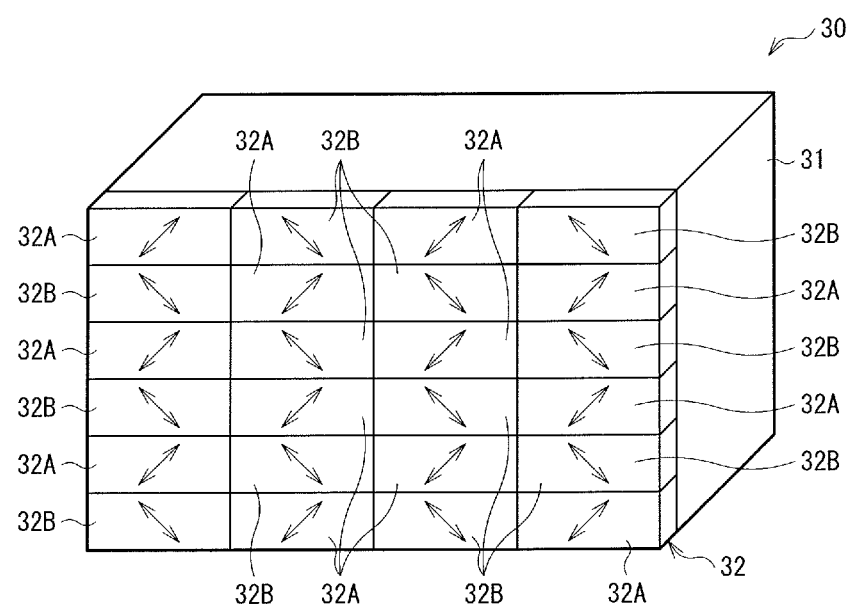
FIG. 12 is a configuration diagram showing still another example of the phase difference element in FIG. 1.

Moreover, while the case has been exemplified in the embodiment and the modification, in which each of the phase difference regions (right-eye region 32A and left-eye region 32B) of the phase difference element 30 extends over the whole phase difference element 30 in a horizontal or vertical direction, the region may be arranged, for example, in a two-dimensional array in both of horizontal and vertical directions as shown in FIG. 12. In addition, even if the region is two-dimensionally arranged, a border between the phase difference regions is defined as border in a vertical direction.

Moreover, while the case where the phase difference element 30 is used for the display device 1 has been exemplified in the embodiment and the modification, the element may be obviously used for other devices.

Figure 13:
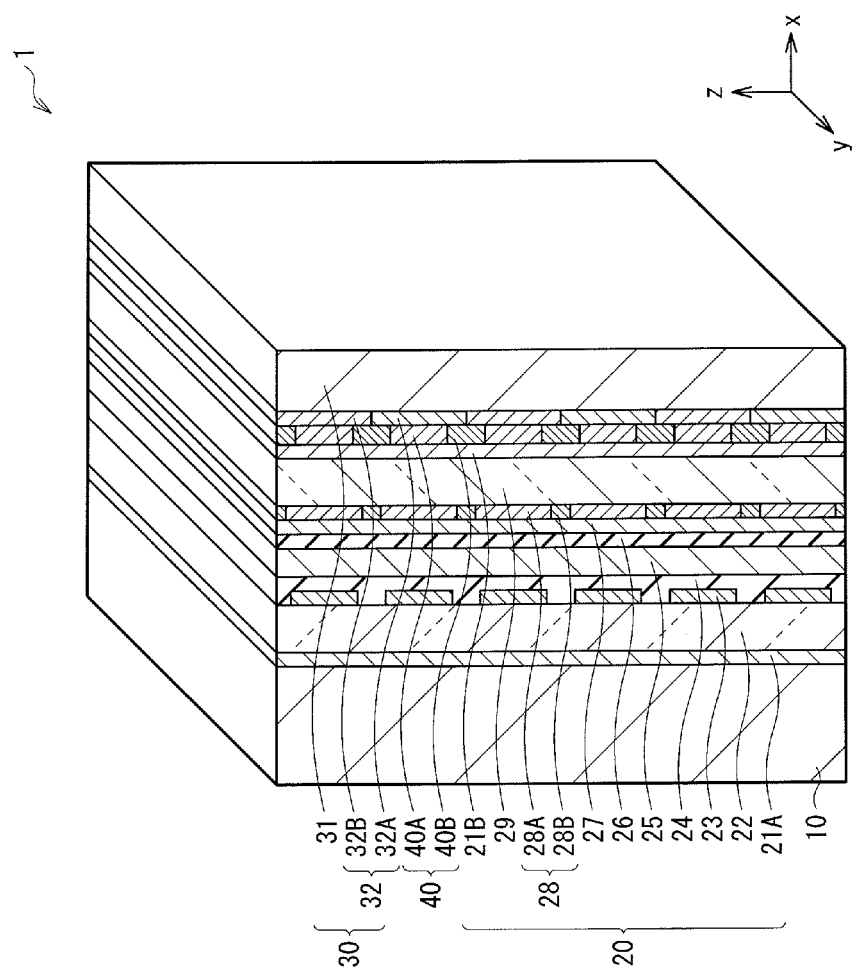
FIG. 13 is a configuration diagram showing another example of the display device of FIG. 1.

Moreover, although a component or the like, which controls an angle of divergence of light outputted from the liquid crystal panel 20, is not particularly provided in the embodiment and the modification, for example, a black stripe section 40 may be provided between the liquid crystal panel 20 and the phase difference element 30 as shown in FIG. 13. The black stripe section 40 has a transmission section 40A provided in a region opposed to the pixel electrodes 23 in the liquid crystal panel 20, and a light blocking section 40B provided in the periphery of the transmission section 40A. This may solve such a problem called crosstalk that when an observer observes an image display surface from an obliquely upper side or obliquely lower side, light passing through a left-eye pixel enters the right-eye region 32A, or light passing through a right-eye pixel enters the left-eye region 32B.

Figure 14:
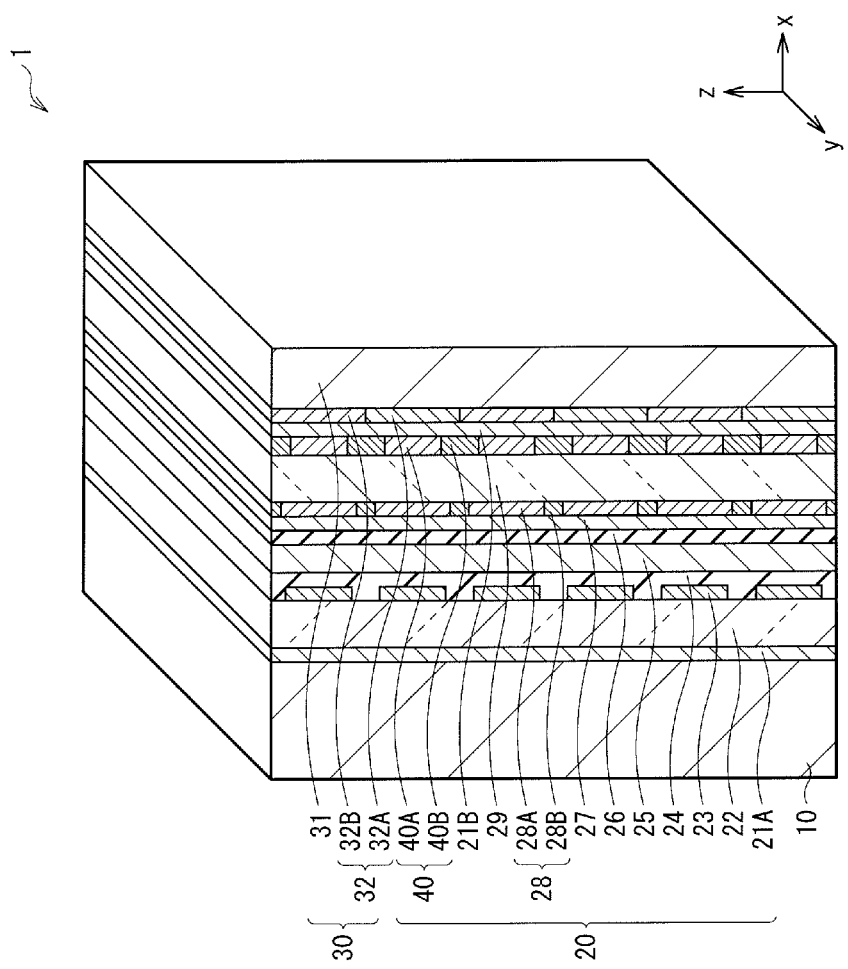
FIG. 14 is a configuration diagram showing still another example of the display device of FIG. 1.

In addition, the black stripe section 40 need not be necessarily provided between the liquid crystal panel 20 and the phase difference element 30, and, for example, may be provided between the polarizing plate 21B and the transparent substrate 29 within the liquid crystal panel 20 as shown in FIG. 14.

While description has been made hereinbefore on the case where the polarizing glass 2 is of a circularly polarizing type, and the display device 1 is a device for a circularly polarizing glass, the phase difference element may be used even in the case that the display device 1 is a device for a linearly polarizing glass.

EXAMPLES

Hereinafter, examples 1 and 2 of the display device 1 of the embodiment are described by comparison with comparative examples 1 and 2.

A phase difference element, in which the slow axis AX3 of the base film 31 was pointed in a vertical direction with respect to the border L1 as shown in FIG. 3, was assumed as example 1, and a phase difference element, in which the slow axis AX3 of the base film 31 was pointed in a horizontal direction with respect to the border L1 as shown in FIG. 4, was assumed as example 2. That is, in the examples 1 and 2, the slow axis AX3 was made to intersect with each of the slow axes AX1 and AX2, and besides, was pointed in approximately the same direction as a direction of a vertical or horizontal bisector of an angle made by the slow axes AX1 and AX2. In contrast, a phase difference element, in which the slow axis AX3 of the base film 31 was pointed in the same direction as a direction of the slow axis AX2 of the left-eye region 32B, was assumed as comparative example 1, and a phase difference element, in which the slow axis AX3 of the base film 31 was pointed in the same direction as a direction of the slow axis AX1 of the right-eye region 32A, was assumed as comparative example 2.

First, an extinction ratio was measured and evaluated for each of the examples 1 and 2 and the comparative examples 1 and 2. The extinction ratio, which is obtained by the following calculation formula (1) or (2), may quantitatively give a level of ghost occurrence.

[Formula 1]

Extinction ratio of right-eye region 32A=luminance in the case that right-eye region 32A is observed by right-eye glass 41/luminance in the case that right-eye region 32A is observed by left-eye glass 42   (1)

[Formula 2]

Extinction ratio of left-eye region 32B=luminance in the case that left-eye region 32B is observed by left-eye glass 41/luminance in the case that left-eye region 32B is observed by right-eye glass 42   (2)

As shown in FIG. 2, the transmission axes AX7 and AX 8 of the polarizing plates 41A and 42A of the polarizing glass 2 are preferably in crossed nicols with respect to the transmission axis AX4 of the polarizing plate 21B on a light emitting side of the display device 1, respectively. Therefore, the transmission axis AX4 of the polarizing plate 21B on the light emitting side was adjusted in a vertical direction, and the transmission axes AX7 and AX 8 were adjusted in a horizontal direction each. In addition, retardation of each of the right-eye region 32A and the left-eye region 32B of the phase difference layer 32 was adjusted to approximately $\lambda/4$. Moreover, the slow axis AX2 of the left-eye region 32B and the slow axis AX6 of the left-eye phase difference film 42B were adjusted to be in the same direction, and the slow axis AX1 of the right-eye region 32A and the slow axis AX5 of the right-eye phase difference film 41B were adjusted to be in the same direction. In such arrangement, calculation of an extinction ratio of each of the right-eye region 32A and the left-eye region 32B was performed in terms of the expanded Jones Matrix method.

In addition, retardation of each of the right and left, phase difference films 41B and 42B of the polarizing glass 2, or retardation of each of the right-eye region 32A and the left-eye region 32B of the phase difference element 30 is preferably $\lambda/4$ or similar to $\lambda/4$ at any wavelength. Here, polycarbonate was assumed as a material of each of the phase difference films 21A and 22B of the polarizing glass 2, and a liquid crystal polymer was assumed as a material of each of the right-eye region 32A and the left-eye region 32B.

Figure 15:
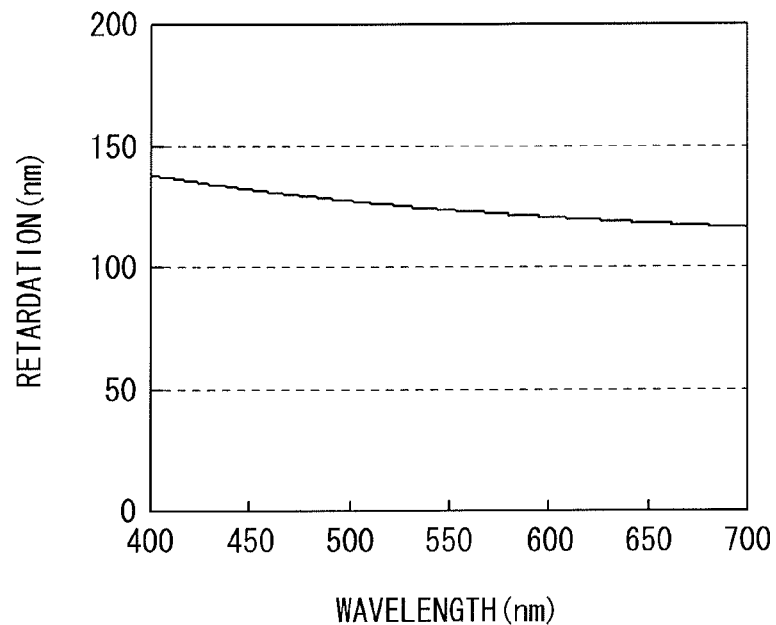
FIG. 15 is a characteristic diagram showing retardation of a phase difference film of a polarizing glass.
Figure 16:
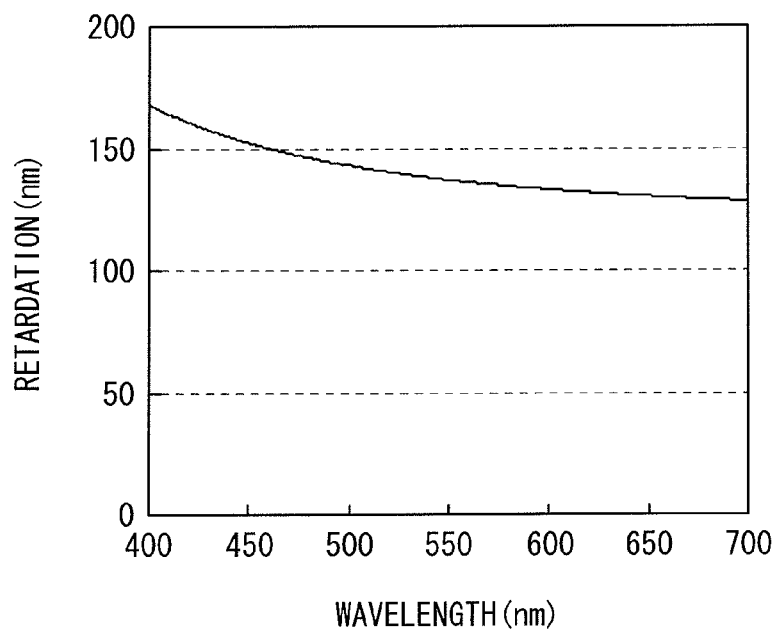
FIG. 16 is a characteristic diagram showing retardation of each of a right-eye region and a left-eye region.
Figures 17, 18:
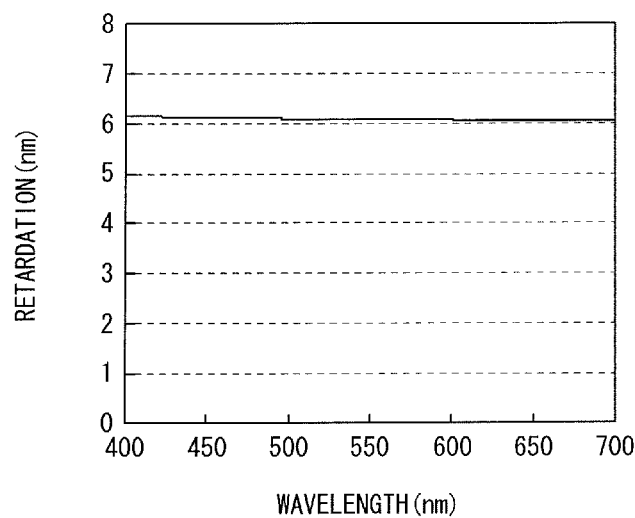
FIG. 17 is a characteristic diagram showing retardation of a base film.
FIG. 18 is a characteristic diagram showing extinction ratios of examples and extinction ratios of comparative examples, respectively.

Assuming that the right-eye phase difference film and the left-eye phase difference film of the polarizing glass 2 had the same retardation, the phase difference films 41A and 42B of the polarizing glass 2 were adjusted to have a retardation value as shown in FIG. 15 each. In addition, assuming that even the right-eye region 32A and the left-eye region 32B had the same retardation, the regions were adjusted to have a retardation value as shown in FIG. 16 each. In contrast, the base film 31 of the phase difference element 30 has slight retardation. Here, a ZEONOR® (ZEON CORPORATION) film 100 μm in thickness was assumed as the base film 31 with a retardation value as shown in FIG. 17. That is, retardation of the base film 31 was assumed to be about 6 nm in a visible range.

FIG. 18 shows a calculation result of extinction ratios. In the comparative example 1, an extinction ratio of the left-eye region 32B is low. This means that a picture of left-eye pixels enters not only a left eye but also a right eye, so that a ghost appears on a picture of the right eye. In the comparative example 2, an extinction ratio of the right-eye region 32A is low. This means that a picture of right-eye pixels enters not only a right eye but also a left eye, so that a ghost appears on the left eye. Therefore, in each of the comparative examples 1 and 2, a ghost clearly appears on only one eye, so that a three-dimensional image is hardly observed. On the other hand, in each of the examples 1 and 2, extinction ratios are the same between both eyes, and thus a ghost does not clearly appear on only one eye. Therefore, a three-dimensional image is preferably easily observed.

Figures 19, 20:
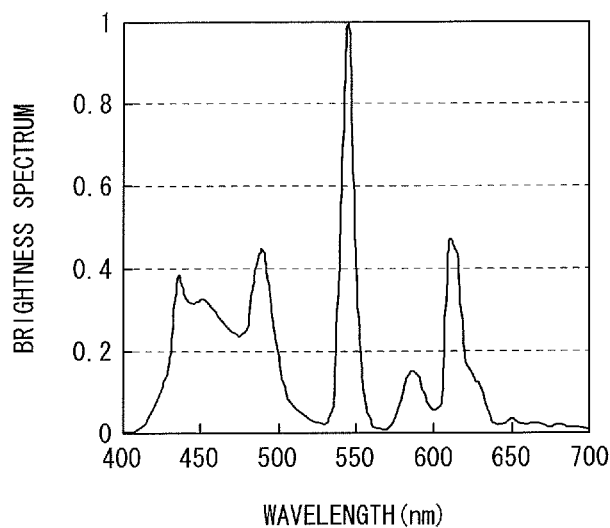
FIG. 19 is a distribution chart showing wavelength distribution in the case that a polarizing glass is not used.
FIG. 20 is a characteristic diagram showing chromaticity in the examples and the comparative examples, respectively.

Next, chromaticity was measured and evaluated for each of the examples 1 and 2 and the comparative examples 1 and 2. FIG. 19 shows wavelength distribution in the case that the polarizing glass 2 is not used. In this case, chromaticity is u'=0.1947 and v'=0.39060 in the L*u*v* color system of CIE (The International Commission on Illumination). FIG. 20 shows chromaticity for each of the examples 1 and 2 and the comparative examples 1 and 2. The figure reveals that while chromaticity is different between right and left eyes, so that a color is differently seen between the eyes in the comparative examples 1 and 2, chromaticity is the same between right and left eyes, and a color is thus not different between the eyes in the examples 1 and 2.

The invention claimed is:

1. A display device comprising:
 a display panel being driven according to an image signal;
 a backlight unit irradiating the display panel; and
 a phase difference element provided on a side opposite to the backlight unit with respect to the display panel,
 wherein the phase difference element includes:
 a base film having optical anisotropy, and
 a phase difference layer having optical anisotropy formed on the base film,
 wherein the phase difference layer has at least two kinds of phase difference regions with slow axes having different directions from each other,
 the at least two kinds of the phase difference regions are adjacently arranged in an in-plane direction of the base film,
 wherein the display panel has a first polarizer in a face on the phase different element side, and a second polarizer in a face opposite to the phase different element, and a slow axis of the base film faces in a direction parallel or vertical to a transmission axis of the first polarizer.

2. The display device according to claim 1, wherein the base film includes a resin film.

3. The display device according to claim 1, wherein a retardation of the base film is 20 nm or less.

4. The display device according to claim 1, wherein a retardation of the base film is 10 nm or less.

5. The display device according to claim 1, wherein directions of the slow axes of the at least two kind of the phase difference regions are different in 90 degrees.

6. The display device according to claim 1, wherein the at least two kinds of the phase difference regions are arranged with a border interposed therebetween.

* * * * *